(12) United States Patent
Noguchi et al.

(10) Patent No.: US 9,811,552 B1
(45) Date of Patent: Nov. 7, 2017

(54) DETECTING AND BUCKETING SPARSE INDICATORS FOR COMMUNICATION GENERATION

(71) Applicants: Katsuya Noguchi, San Francisco, CA (US); Krishna Pant, San Jose, CA (US); Ryan Barrett, San Francisco, CA (US); Elad Gil, San Francisco, CA (US); Othman Laraki, Atherton, CA (US)

(72) Inventors: Katsuya Noguchi, San Francisco, CA (US); Krishna Pant, San Jose, CA (US); Ryan Barrett, San Francisco, CA (US); Elad Gil, San Francisco, CA (US); Othman Laraki, Atherton, CA (US)

(73) Assignee: COLOR GENOMICS, INC., Burlingame, CA (US)

( * ) Notice: Subject to any disclaimer, the term of this patent is extended or adjusted under 35 U.S.C. 154(b) by 0 days.

(21) Appl. No.: 15/133,089

(22) Filed: Apr. 19, 2016

Related U.S. Application Data

(60) Provisional application No. 62/150,218, filed on Apr. 20, 2015, provisional application No. 62/274,660, filed on Jan. 4, 2016.

(51) Int. Cl.
*G06F 17/30* (2006.01)
*G06F 7/00* (2006.01)

(52) U.S. Cl.
CPC .. *G06F 17/30371* (2013.01); *G06F 17/30327* (2013.01); *G06F 17/30598* (2013.01); *G06F 17/30867* (2013.01)

(58) Field of Classification Search
CPC ......... G06F 17/30371; G06F 17/30327; G06F 17/30598; G06F 17/30867
See application file for complete search history.

(56) References Cited

U.S. PATENT DOCUMENTS

| | | | | |
|---|---|---|---|---|
| 6,691,109 | B2 * | 2/2004 | Bjornson | G06F 17/30445 |
| 9,354,922 | B2 * | 5/2016 | Lee | G06F 17/30722 |
| 2010/0153017 | A1 * | 6/2010 | De La Vega | G06F 19/26 |
| | | | | 702/19 |
| 2011/0098193 | A1 * | 4/2011 | Kingsmore | C12Q 1/6869 |
| | | | | 506/9 |
| 2015/0056613 | A1 * | 2/2015 | Kural | G06F 19/28 |
| | | | | 435/6.11 |
| 2015/0379193 | A1 * | 12/2015 | Bassett, Jr. | G06F 19/28 |
| | | | | 702/19 |

(Continued)

FOREIGN PATENT DOCUMENTS

WO WO2013070634 * 5/2013 ............. G06F 19/22

OTHER PUBLICATIONS

Berivan Baskin et al., Implementing ACMG Guidelines on Sequence Variant Interpretation: Software-assisted Variant Curation and Filtering, Cartagenia Bench Lab, published Oct. 2016.*

(Continued)

*Primary Examiner* — Jeffrey A Burke
(74) *Attorney, Agent, or Firm* — Kilpatrick Townsend & Stockton LLP

(57) ABSTRACT

Techniques, systems, and products for analyzing sparse indicators and generating communications based on bucketing of sparse indicators are disclosed.

20 Claims, 12 Drawing Sheets

(56) References Cited

U.S. PATENT DOCUMENTS

| 2016/0048564 A1* | 2/2016 | Bassett, Jr. | G06F 17/30525 |
| | | | 715/230 |
| 2016/0253452 A1* | 9/2016 | Karbassi | G06F 19/18 |
| | | | 705/2 |
| 2016/0275239 A1* | 9/2016 | Devogelaere | G06F 19/24 |

OTHER PUBLICATIONS

Karin Kassahn et al., Integrating Massively Parallel Sequencing into Diagnostic Workflow and Managing the Annotiation and Clinical Interpretation Challenge, Official Journal Human Genome Variation Society, Published Feb. 2014.*
Sue Richards et al., Standards and Guidlines for the Interpretation of Sequence Variants: a Joint Consensus Recommendation of the American College of Medical Genetics and Genomics and the Association for Molecular Pathology, Genetics in Medicine, published Mar. 2015.*

* cited by examiner

DETECTING AND BUCKETING SPARSE INDICATORS FOR COMMUNICATION GENERATION

CROSS-REFERENCE TO RELATED APPLICATIONS

This application claims the benefit of and priority to U.S. Provisional Application 62/150,218, filed Apr. 20, 2015, and U.S. Provisional Application 62/274,660, filed Jan. 4, 2016. Each of these applications is hereby incorporated by reference in its entirety for all purposes.

FIELD

Methods and systems disclosed herein relate generally to processing of data sets to identify and bucket sparse indicators, and bucket contents can then be used for communication generation. Specifically, a sparse indicator can be assigned to a bucket using a work flow so as to process individual sparse indicators in accordance with a present stage.

BACKGROUND

Computational resources have become less expensive, and processing capabilities has become more sophisticated. Accordingly, the number and size of data sets has been exponentially increasing. It is therefore important to decide how to effectively and efficiently process these data sets. One approach is to use reference data sets and to selectively concentrate on how individual data sets differ from one or more reference data sets. By detecting these differences, a more compact representation of a data set is reached.

SUMMARY

Described herein are devices, systems, methods, and computer program products for facilitating assignment of sparse indicators to data buckets. In some embodiments, systems for generating communications based on numbers of sparse indicators assigned to particular data buckets are provided. In some embodiments, a system comprises one or more hardware processors; and a non-transitory computer readable storage medium in data communication with the one or more hardware processors, the non-transitory computer readable storage medium comprising instructions that, when executed by the one or more hardware processors, cause the one or more hardware processors to perform operations including: determining, at the one or more hardware processors, that a first data set includes one or more sparse indicators, such as where each sparse indicator corresponds to an instance of one or more values in the first data set differing from a corresponding one or more values in a reference data set, and where each sparse indicator is associated with a position and one or more values; accessing a work flow for assigning sparse indicators to data buckets, such as a work flow that includes a plurality of stages organized according to a hierarchical structure, and where a trajectory through the work flow is determined based on successive results generated for one or more of the plurality of stages; for each of the one or more sparse indicators, performing a work flow iteration by: iteratively performing, at the one or more processors, an automated processing in accordance with each of one or more stages of the plurality of stages according to the work flow based on at least one of: a position associated with the sparse indicator; the one or more values associated with the sparse indicator; and a result of a previous stage; where a result of the stage is generated at least partly in response to the automated processing, and wherein a next stage is determined based on the result of the stage; and assigning the sparse indicator to a data bucket of a plurality of data buckets based on results of the iterative performance of the automated processing; determining whether a number of sparse indicators assigned to a particular data bucket of the plurality of data buckets exceeds a predefined threshold; and generating a communication indicative of whether a number of sparse indicators assigned to the particular data bucket exceeds the predefined threshold.

In some embodiments, methods for generating communications based on numbers of sparse indicators assigned to particular data buckets are provided. In some embodiments, a method comprises determining, at one or more hardware processors, that a first data set includes one or more sparse indicators, such as where each sparse indicator corresponds to an instance of one or more values in the first data set differing from a corresponding one or more values in a reference data set, and where each sparse indicator is associated with a position and one or more values; accessing a work flow for assigning sparse indicators to data buckets, such as a work flow that includes a plurality of stages organized according to a hierarchical structure, and where a trajectory through the work flow is determined based on successive results generated for one or more of the plurality of stages; for each of the one or more sparse indicators, performing a work flow iteration by: iteratively performing, at the one or more processors, an automated processing in accordance with each of one or more stages of the plurality of stages according to the work flow based on at least one of: a position associated with the sparse indicator; the one or more values associated with the sparse indicator; and a result of a previous stage; where a result of the stage is generated at least partly in response to the automated processing, and wherein a next stage is determined based on the result of the stage; and assigning the sparse indicator to a data bucket of a plurality of data buckets based on results of the iterative performance of the automated processing; determining whether a number of sparse indicators assigned to a particular data bucket of the plurality of data buckets exceeds a predefined threshold; and generating a communication indicative of whether a number of sparse indicators assigned to the particular data bucket exceeds the predefined threshold.

In some embodiments, computer program products for generating communications based on numbers of sparse indicators assigned to particular data buckets are provided. In some embodiments, a computer program product comprises a non-transitory computer readable storage medium comprising instructions that, when executed by one or more hardware processors, cause the one or more hardware processors to perform operations including: determining, at the one or more hardware processors, that a first data set includes one or more sparse indicators, such as where each sparse indicator corresponds to an instance of one or more values in the first data set differing from a corresponding one or more values in a reference data set, and where each sparse indicator is associated with a position and one or more values; accessing a work flow for assigning sparse indicators to data buckets, such as a work flow that includes a plurality of stages organized according to a hierarchical structure, and where a trajectory through the work flow is determined based on successive results generated for one or more of the plurality of stages; for each of the one or more sparse indicators, performing a work flow iteration by: iteratively performing, at the one or more processors, an automated processing in accordance with each of one or more stages of the plurality of stages according to the work flow based on at least one of: a position associated with the sparse indicator; the one or more values associated with the sparse indicator; and a result of a previous stage; where a result of the stage is generated at least partly in response to the automated processing, and wherein a next stage is determined based on the result of the stage; and assigning the sparse indicator to a data bucket of a plurality of data buckets based on results of the iterative performance of the automated processing; determining whether a number of sparse indicators assigned to a particular data bucket of the plurality of data buckets exceeds a predefined threshold; and generating a communication indicative of whether a number of sparse indicators assigned to the particular data bucket exceeds the predefined threshold.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

Illustrative embodiments of the present invention are described in detail below with reference to the following drawing figures.

DETAILED DESCRIPTION

Figure 1:
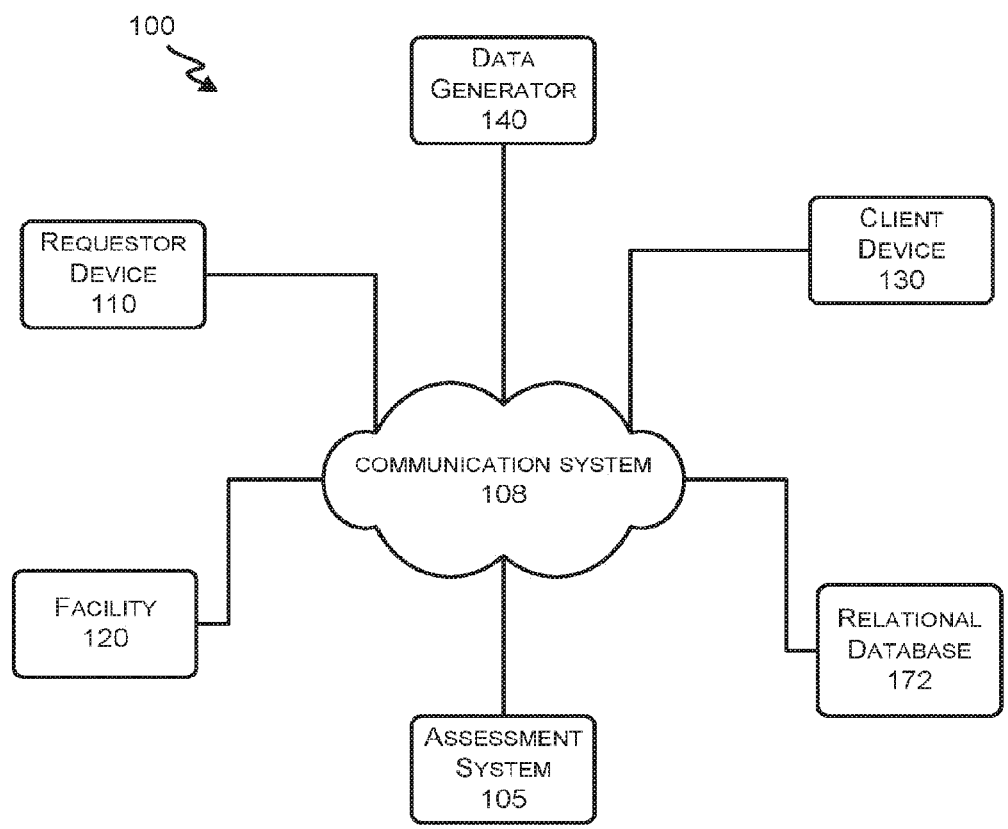
FIG. 1 shows a representation of an example communication network, in accordance with some embodiments.

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart or diagram may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

In general the terms and phrases used herein have their art-recognized meaning, which can be found by reference to standard texts, journal references and contexts known to those skilled in the art. The following definitions are provided to clarify their specific use in the context of the invention.

The term "automated processing" refers to one or more operations that may be handled independently by a computer, machine, or system without user intervention or input, such as to generate or identify a result. In some embodiments, an automated processing may be associated with a stage of a work flow. In some embodiments, an automated processing may, however, make use of user input, such as if a stage-progression condition is not satisfied.

The term "stage" refers to one element, process, or operation of a work flow. It will be appreciated that multiple stages may be included in a work flow, which may differ from one another or may be the same, depending on the particular work flow. Stages may be associated with a stage-progression condition that, in some embodiments, may be satisfied before the stage may complete and advance processing of a work flow to a next stage.

The term "work flow" refers to a process control scheme that dictates which stages follow which other stage in a multi-stage process. In some embodiments, a work flow corresponds to a plurality of stages organized according to a hierarchical structure. In some embodiments, a work flow is a determinative process that, when run through, will end in the same result if the same decisions are followed in the same way as a previous run through the work flow. In some embodiments, a work flow may identify queries, the responses to which will determine which stage(s) may follow a previous stage, such as according to a hierarchical structure. One example work flow useful with aspects described herein is described in the ACMG framework. In some embodiments, the term "work flow" is synonymous with the term "decision tree." A work flow may be performed iteratively, such as for each of a plurality of sparse indicators, where different iterations may be independent of other iterations. A "trajectory" in or of a work flow refers to a path or succession of operations or stages that are part of the work flow that are processed or followed for a particular iteration of the work flow. It will be appreciated that each iteration of a work flow may follow a different trajectory.

The term "sparse indicator" refers to a data value in a data set that exhibits a different value from a reference data set. In some embodiments, the term "sparse indicator" may be synonymous with the term "variant," and is associated with a change of one or more values in a data set as compared to a reference data set. In some embodiments, the reference data set is a full reference data set or a partial reference data set that may be a subset of the full reference data set. In some embodiments, sparse indicators are associated with a position, which may refer to an absolute position of the sparse indicator in a full data set or a relative position of the sparse indicator in a partial data set or subset of the full data set. In some embodiments, sparse indicators are associated with values that may reflect an identity of the sparse indicator. For example, in embodiments where a sparse indicator is a variant, one or more values associated with the sparse indicator may correspond to the specific identity of bases of the sparse indicator that differ from the reference data set.

The term "unit structure" refers to a translated plurality of data values, which may correspond to a different type of element than that represented by the plurality of data values. For example, in some embodiments, a unit structure may correspond to a connected series of amino acids in which a plurality of bases are translated into the individual amino acids according to a formulaic algorithm. In some embodiments, the term "unit structure" is synonymous with the term "protein." Unit structures may be associated with sparse indicators, such as when a plurality of data values associated with the sparse indicator and, optionally, at positions adjacent to the sparse indicator are translated into an amino acid order.

The term "data set availability" refers to the ability of a plurality of bases to be translated to a unit structure and/or to impact characteristics of a cell, for example. In some embodiments, the term "data set availability" may be synonymous with the term "epigenetic." For example, the data set availability of a plurality of bases may be impacted by a structural form of the plurality of bases, such as where a plurality of bases are positioned at an interior of a physical group of the plurality of bases and cannot be physically expressed to form amino acids. It will be appreciated that other characteristics relating to why a plurality of bases may not be expressible are encompassed by the term "data set availability."

The term "data bucket" refers to a group or category of data objects, such as sparse indicators, that may share a common characteristic. Data bucketing may correspond to a process for quantizing objects and may allow for identification of a number or quantity of objects that share the group, category, and/or characteristic. In some embodiments, particular data objects are assigned to data buckets in order to classify the data objects and allow for grouping of common or related data objects. In some embodiments, different data buckets are associated with different classifications, which may identify a characteristic or predicted effect of a particular data object. For example, in some embodiments, data buckets useful for classifying or categorizing a sparse indicator may be associated with a predicted impact of the sparse indicator for an individual transitioning into a particular state. For example, in some embodiments, sparse indicators may be assigned to data buckets including, but not limited to, those identified as Deleterious, Likely Deleterious, Unknown, Likely Non-Deleterious, and Non-Deleterious. As used herein, the term "deleterious" may be synonymous with the term "pathogenic" and may identify a propensity for transitioning into a particular state, for example. Similarly, the term "non-deleterious" may be synonymous with the term "benign" and may identify an impact of not harmful or predicted to be not harmful, for example.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, data store writes/reads, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Referring initially to FIG. 1, an assessment network 100 is shown in one embodiment. Through the interaction of multiple devices and entities, an assessment system 105 may receive data sets corresponding to individual clients. Data sets may be aligned and compared to reference data sets. The comparison may include detecting differences between each client data set and the reference data set, each of which can be represented by a sparse indicator that identifies one or more position indices and data-set values of the difference. The sparse indicators can be processed to generate, for each client, an output corresponding to a predicted likelihood of the client transitioning into a particular state.

As illustrated, assessment system 105 may connect, via communication system 108, to each of one or more other systems or devices. Assessment network 100 may also include additional systems or devices, as illustrated in FIG. 1. For example, assessment network 100 may include requestor device 110, facility 120, client device 130, data generator 140, and relational database 172, in addition to other systems or devices not explicitly depicted in FIG. 1.

Data may be exchanged between various systems or devices of assessment network, such as by way of communication system 108. Communication system 108 may, for example, include one or more data communication systems or networks, such as a wired or wireless data connection that makes use of or is compliant with one or more Institute of Electrical and Electronics Engineers (IEEE) networking standards, such as 802.3 (Ethernet), 802.11 (Wi-Fi), or 802.16 (WiMAX), or other data communications standards such as IEEE 1394 (FireWire), Bluetooth, Universal Serial Bus (USB), Serial ATA (SATA), Parallel ATA (PATA), Thunderbolt, Fibre Channel, Small Computer System Interface (SCSI), GSM, LTE, etc. Communication system 108 may include one or more TCP/IP compliant interconnections, such as may be present on a private or public communications network, such as the Internet. Communication system 108 may further include servers, systems, and storage devices in the cloud. Communication system 108 may represent or include one or more intermediate systems or data connections between various other components of assessment network 100. Additionally, communication system 108 may represent a direct connection between various other components of assessment network 100, such as a direct connection between assessment system 105 and relational database 172, which may optionally allow for communication with relational database 172 by other components of assessment network 100 only by way of assessment system 105, for example. It will be appreciated that relational database 172 may include one or more data stores, which may optionally be linked or otherwise configured or organized to allow for efficient retrieval and storage of data by reference to different entries in particular data stores or data tables.

One or more of the devices or systems of assessment network 100 may be present at a single location or each may be present at various different locations and be in data communication with one another via communication system 108, depending on the specific configuration. For example, facility 120 and data generator 140 may be at a same location. Requestor device 110 may further be present at facility 120, such as if possessed by a requestor personnel, for example. Similarly, client device 130 may also be present at data generator 140 or facility 120, such as if possessed by a client, for example. In some embodiments, one or more devices or systems of assessment network 100 may be mobile devices, such as a smartphone, tablet computer, laptop, or other compact device, which may facilitate transport between locations or with a user or client. Use of mobile devices may, for example, be advantageous for allowing input to be entered in real-time and/or on request from any location in order to facilitate expedient processing and/or analysis of data or generation of state assessments.

Figure 2:
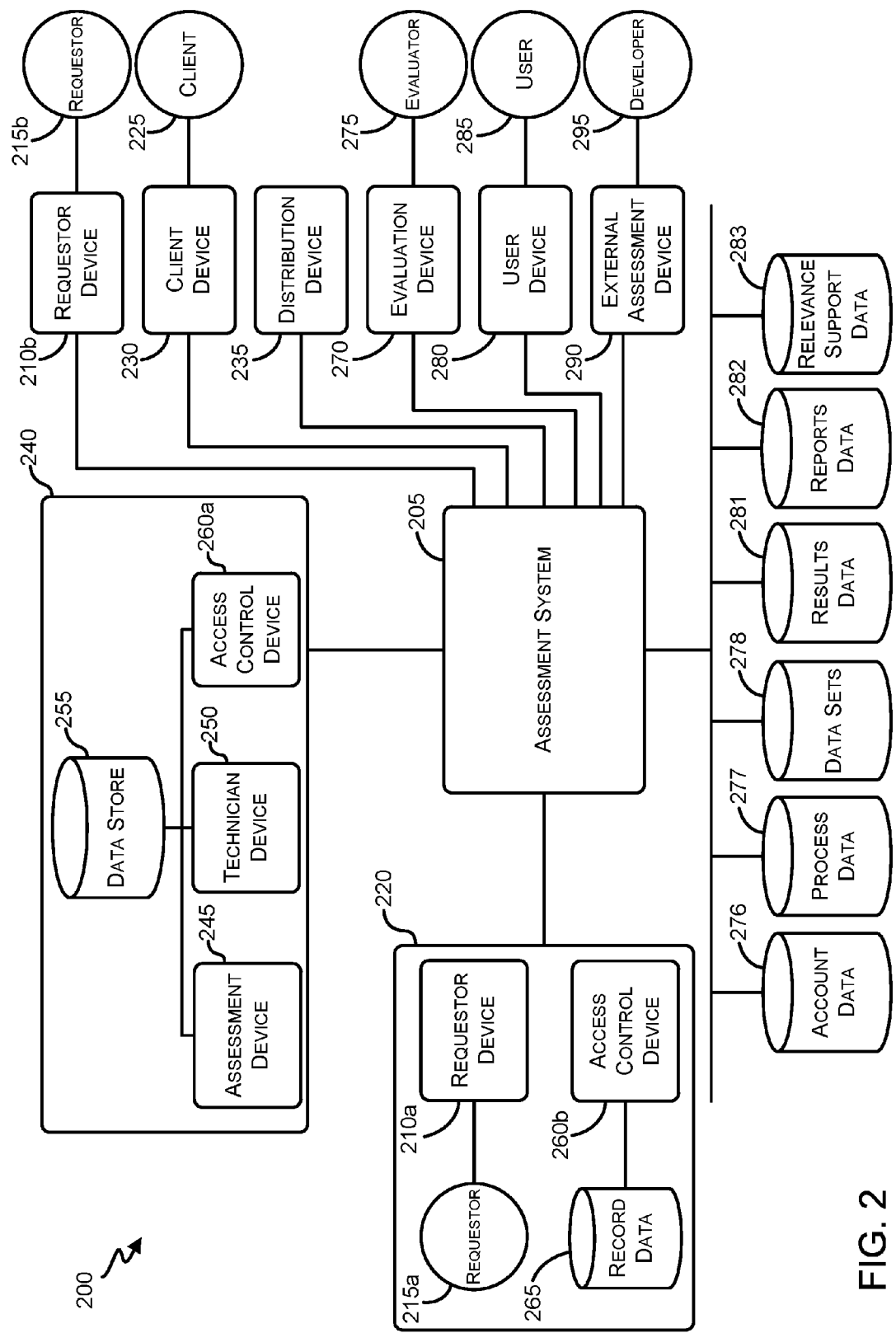
FIG. 2 shows a representation of a data processing network, in accordance with some embodiments.
Figure 3:
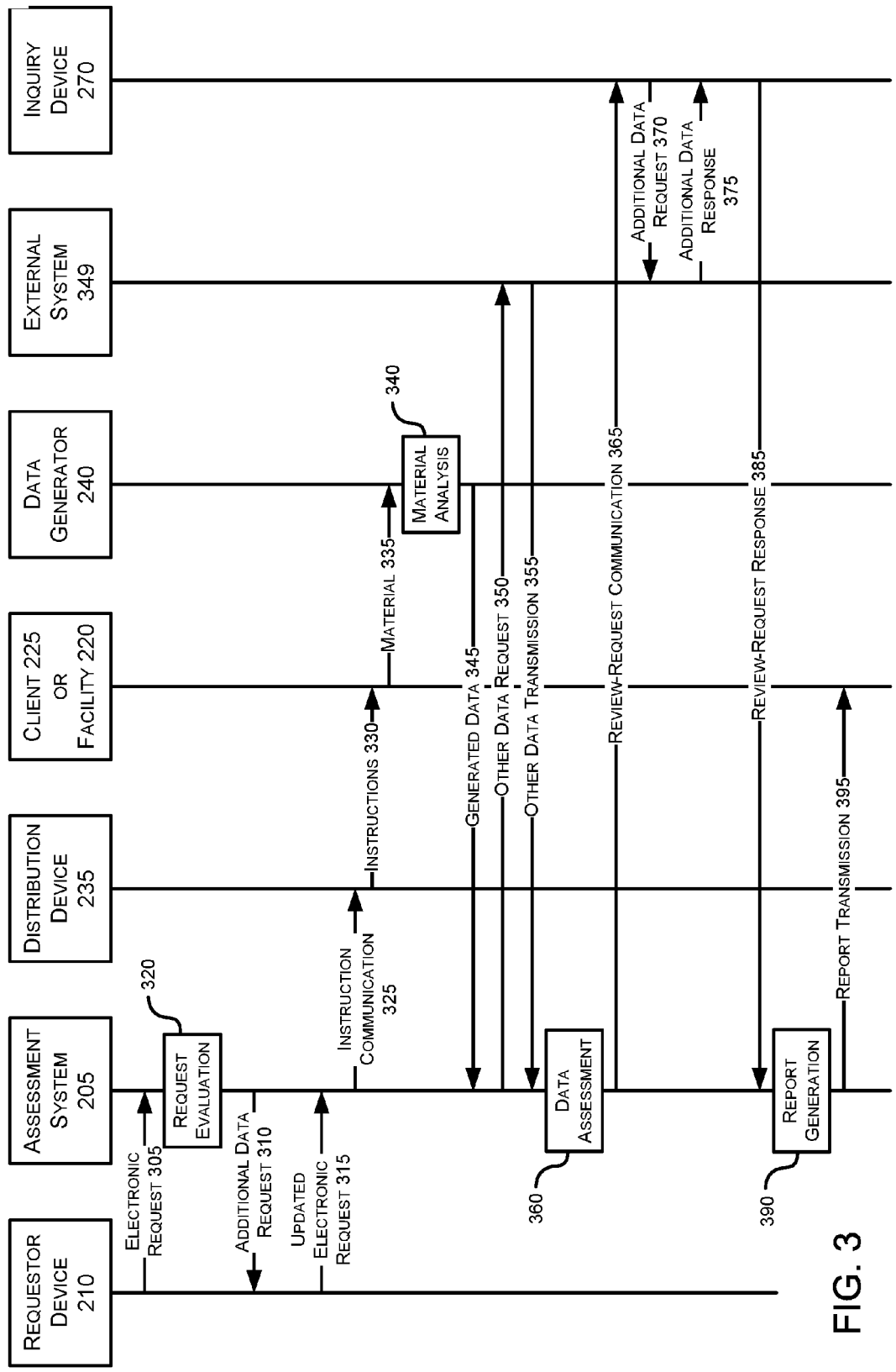
FIG. 3 shows a communication exchange between systems and devices of an data processing network, in accordance with some embodiments.

FIG. 2 shows a representation of an assessment network 200, which may, but need not, correspond to assessment network 100 shown in FIG. 1. In addition, FIG. 3 illustrates interactions between various systems or components of assessment network 200 to illustrate the flows of data and materials, for example. In some embodiments, assessment network 200 is a genetic assessment network. Assessment system 205 may, for example, receive an electronic request 305 from a requestor device 210. Assessment system 205 may include one or more electronic devices (e.g., storage devices, servers, and/or computers) and may, but not need, reside partly or entirely at a remote server. Requestor device 210 may be configured and located to receive input from a requestor 215. In one instance, requestor device 210*a* is located in an external facility 220. In one instance, requestor device 210*b* includes an internally linked requestor device 210*b*, such as one that itself receives invitations, such as from assessment system 205, to generate electronic requests.

Request 305 may include instructions to conduct a dataset analysis, for example. Optionally, request 305 may be encrypted prior to transmission; such an electronic request may be decrypted upon receipt. Request 305 may identify, or otherwise indicate, one or more states to be evaluated during the analysis and/or during an assessment. Request 305 may identify a client and/or include additional data pertaining to the client, such as identifying-data, health-data, and/or medicine-data of the client.

The client may be equated to, by assessment system 205, a client device 230. In some instances, a client device 230, associated with client 225, initially transmits a preliminary electronic request for the analysis and/or assessment to assessment system 205. For example, such a preliminary electronic request may be initiated via interaction with a website associated with assessment system 205. The same or a subsequent preliminary request may identify a particular requestor (e.g., by name, office location, phone number, and/or email address) and/or may request that a requestor 215*b* associated with an internally linked requestor device 210*b* submit such a request.

When a particular entity is identified in a preliminary electronic request, assessment system 205 may identify a destination address (e.g., IP address or email address) associated with the entity and transmit a communication identifying information associated with the preliminary request (e.g., the client, a type of analysis, and so on). The communication may include a partial instruction and/or an input field that would confirm that the request of the client 225 is to be generated and transmitted back to assessment system 205. Such a communication may facilitate receipt of the electronic request from requestor device 210*b*.

When it is requested that a requestor 215*b* associated with an internally linked requestor device 210*b* submit such a request, assessment system 205 may transmit a similar communication to a requestor device 210*b* that may have been selected from among multiple internally linked requestor devices. The selection may be based on a load balancing technique, availability hours, expertise, locations of the multiple requestor devices, a pseudo-random selection technique, and/or an entity affiliation.

Once request 305 has been received from a requestor device 210 (e.g., in response to a preliminary request from a client device 230), assessment system 205 may evaluate, such as at block 320, the request 305 to ensure that all required data has been provided and that all required data pertaining to client 225 has been identified (e.g., via the request, a preliminary request and/or stored data). If assessment system 205 determines that all required information has not been identified, a request 310 for such information may be transmitted to requestor device 210 and/or client device 230. The request 305 may be updated with this information and an updated electronic request 315 may be transmitted to assessment system 205. In various instances, an object provided to a user depends on an analysis requested, whether, and what kind of, new data-generation processing of a sample is required for the analysis, a number of data-set units being assessed (e.g., and whether they have been previously assessed), a number and/or type of analyses being requested, a number and/or type of analyses previously requested, a number and/or type of analyses predicted to be requested subsequently, whether a user is granting other entities' access to the client's data or results, whether a user is authorizing additional analyses to be performed on the client's data, and/or whether a user is granting permission to send offers to request user access to results or reports other than those initially being requested.

When all required information has been provided, assessment system 205 may send an instruction communication 325 to a distribution device 235. Optionally, communication 325 may be encrypted prior to transmission; such an encrypted communication may be decrypted upon receipt. Optionally, communication 325 may be transmitted using communications system 208 and/or over one or more network links, such as including transmission, at least in part, over a public communications network, such as the Internet. Communication 325 may include, for example, a name and address of client 225 and, in some instances, an indication as to what is to be provided to client 225 for collection of a material for subsequent analysis. For example, a request 305 may indicate a type of analysis that is to be performed on a material (e.g., an analysis pertaining to a likelihood of getting one or more particular types of states) and/or a type of material (e.g., type of sample) that is to be analyzed. Communication 325 may identify the type of analysis, type of material, and/or kit associated with collection of the material. The communication 325 may thus facilitate and/or trigger a physical distribution of instructions 330, which may include a kit or other sample collection materials, to a client address. The instructions 330 may include, for example, instructions as to how to collect a material, a container for storing the material and/or information pertaining to an instruction or type of analysis to be conducted. Alternatively, the instructions 330 may be provided to a facility 220, such as may be associated with a requestor 215a, who may aid client 225 in obtaining the material.

A material 335 from client 225 may then be directed to and received at a data generator 240 for analysis 340. Data generator 240 may be, for example, part of a facility. Data generator 240 may include one or more assessment devices 245 configured to generate data vectors for various data-set units using the material 335 as part of analysis 340. For example, an assessment device 245 may include a sequencer and/or polymerase chain reaction machine. Data generator 240 may further include one or more devices 250, such as a desktop or laptop computer. Generated data 345 generated by or at one or more devices (e.g., assessment device 245 or technician device 250) may be stored at a data store 255, which may be remote from all data generator devices or part of a data generator device. The data 345 may, for example, include identifying client information (e.g., a name and address), facility information (e.g., location and name), device specifications (e.g., manufacturer and model of assessment device) and data. In some embodiments, a facility, such as facility 220 or facility 240, may correspond to a lab.

In some instances, data is optionally collected or requested from one or more external systems 349. Thus, assessment system 205 may transmit one or more other data requests 350 and one or more other data transmissions 355 may provide the other data. For example, one or more data sets and/or one or more processed versions thereof (e.g., identifying one or more sparse indicators) corresponding to an existing or new client may be received from an external system 349. As another example, assessment system 105 may transmit a client data set to an external system 349, and external system 349 may then return a result of an assessment of the client data set. As yet another example, other data may include a data-set (or results based on such data) corresponding to another individual (e.g., an entity related to a client and/or an entity sharing a characteristic with a client). The other individual may be, for example, identified based on input from the client and/or automatically identified (e.g., based on a query of a data store to identify clients associated with inputs or results indicating a shared characteristic or relationship). In some instances, a state assessment variable may be generated based on data from multiple other people, and the data for each other person may be weighted based on (for example) how closely related the person is with a client and/or how many or which characteristics the person shares with a client.

An access control device 260a may control which devices and/or entities may gain access to the data 345, which may apply to devices and/or entities internal to data generator 240 and/or to devices and/or entities external to data generator 240. Access control device 260a may implement one or more rules, such as restricting access to client data to one or more particular devices (e.g., associated with assessment system 205). Such access may further or alternatively be controlled via logins, passwords, device identifier verification, etc.

In various instances, access control device 260a controls access via control of pushed transmissions and/or via control of processing pull requests. For example, a rule may indicate that data 345 pertaining to a material, such as a sample, is to automatically be transmitted to a particular assessment system 205 (and/or device associated therewith) upon completion of a facility-based assessment or detection of particular data (e.g., data matching a request). Access control device 260a may then monitor for such a criterion to be met and may then generate and transmit appropriate data.

Data 345 may include a plurality of data vectors (e.g., each data vector in the plurality of data vectors corresponding to a same client, or at least some of the plurality of data vectors corresponding to different clients). It may be advantageous to exclude one or more of the plurality of data vectors from the data 345 transmitted to assessment system 205 or to exclude one or more of the plurality of data vectors from the data 345 upon receipt at assessment system 205. For example, the plurality of data vectors may include duplicate vectors. As another example, a data vectors may correspond to a sub-threshold quality metric. In various instances, a device at data generator 240 or assessment system 205 may evaluate data vectors for potential exclusion. It will be appreciated that two duplicate data vectors need not correspond to precisely a same set of positions relative to a reference data set, as one data vectors may include data at a beginning or end of the vector not present in the other. Accordingly, the evaluation may include aligning each data vector with a reference data vector.

In various instances, data 345 may be transmitted to assessment system 205 in a batch-mode, in a streaming mode, in real-time as data is produced, and/or upon request. Data 345 may also be stored at a data store local or remote to data generator 240. A given transmission or stream may include data that corresponds to a single, or in other instances to multiple, client, sample, and/or data vector. In some instances, access control device 260*a* evaluates one or more transmission conditions, which may indicate, for example, whether and/or what data is to be transmitted given a quantity of data collected (e.g., generally, since a past transmission and/or for a given client or sample) and/or given a time since a previous transmission. In one instance, as data vectors are generated by an assessment device, a data set is generated so as to include each new data vector and one or more identifiers (e.g., of a client, sample, time and/or facility device). The data may then be transmitted via a discrete communication (e.g., via FTP, over a webpage upload, email message, or SMS message) to assessment system 205. In one instance, the data may then be appended to a stream that is being fed to assessment system 205.

It will be appreciated that assessment network 200 may, in some instances, include multiple data generators 240, each of which may include an assessment device 245, technician device and/or access control device 260*a*. Further, a given data generator 240 may, in some instances, include multiple assessment devices 245, multiple technician devices 250 and/or multiple access control devices 260*a*. Thus, data 345 received at assessment system 205 may include data collected by and/or derived from data collected by different assessment devices, which may result in the data having different biases, units, and/or representation. Similarly, personnel operating different technician devices 250 may utilize different protocols and/or data interpretation techniques, which may again result in receipt of data at assessment system 205 that has different biases, units, variables, and so on. Further, even data originating from a same device may, in time, exhibit different biases, units, and so on, which may be a result of a manipulation of a control of the device and/or equipment wear.

Thus, in some instances, assessment system 205 performs a comparison across data 345 received from a data generator device (e.g., an access control device 260*a* or directly from an assessment device 245 or technician device 250) associated with data generator 240. The comparison may be across, for example, data collected at different facilities, data based on measurements collected at different devices, and/or data collected at different times. It will be appreciated that the comparison may include a direct comparison of collected data or comparing preprocessed versions of the collected data. For example, received data may first be preprocessed via a transformation and/or dimensionality-reduction technique, such as principal component analysis, independent component analysis, or canonical correspondence analysis.

The comparison may include, for example, performing a clustering technique so as to detect whether data corresponding to a given facility, device, or time period predominately resides in a different cluster than data corresponding to one or more other facilities, devices, or time periods. The clustering technique may include, for example, a connectivity based clustering technique, a centroid-based clustering technique (e.g., such as one using k-means clustering), a distribution-based clustering technique, or a density-based clustering technique.

The comparison may additionally or alternatively include a statistical technique, such as one that employs a statistical test to determine whether two or more data sets (e.g., corresponding to different facilities, devices, or time periods) are statistically different. For example, a Chi-square, t-test or ANOVA may be used.

The comparison may additionally or alternatively include a time-series analysis. For example, a regression technique may be used to determine whether output from a given device is gradually changing in time.

When it is determined that particular data corresponding to a given facility, device, or time period is different than data corresponding to one or more other facilities, devices, or time periods (e.g., is assigned to a different cluster than other data or is associated with a p-value below a threshold), a normalization and/or conversion factor may further be identified. For example, a normalization and/or conversion factor may be identified based on centroids of data clusters and/or inter-cluster distances. As another example, a linear or non-linear function may be derived to relate data from a given facility, device, or time period to other data.

In some instances, a determination that particular data corresponding to a given facility, device, or time period is different than data corresponding to one or more other facilities, devices, or time periods may indicate that data from the given facility, device, or time period is not to be used. In such instances, an instruction communication may be sent to a facility to reprocess a material, such as a sample.

In addition to receiving data 345, assessment system 205 may further collect one or more other data that may be used to assess, for example, a likelihood for transitioning into a particular state. For example, one type of other data may include inputs provided at a client device 230, such as inputs that indicate past-state data and/or current-state data, familial-state data and statuses, age, occupation, activity patterns, association with environments having particular characteristics, and so on. The other data may be received by way of one or more other data transmissions 355 from external system 349. Optionally, other data transmission 355 may be encrypted prior to transmission; such an encrypted transmission may be decrypted upon receipt. Optionally, other data transmission 355 may be transmitted over one or more network links, such as including transmission, at least in part, over a public communications network, such as the Internet. Optionally, other data transmission 355 may be transmitted over at least a portion of communications system 208.

Another type of other data may include data automatically detected at a client device 230. For example, a wearable client device may track activity patterns so as to estimate calories burned per day, or the wearable client device may estimate a pulse distribution, client temperature, sleep patterns and/or indoor/outdoor time. This data obtained directly by client device 230 may be directly transmitted (e.g., after request 350 and/or authorization handshake) to assessment system 205 and/or via another client device (e.g., via accessing health-data on a phone or computer device). Optionally, other data obtained directly by client device 230 may be transmitted over one or more network links, such as including transmission, at least in part, over a public communications network, such as the Internet. Optionally, other data obtained directly by client device 230 may be transmitted over at least a portion of communications system 208. Optionally, other data obtained directly by client device 230 may be part of other data transmission 355.

Yet another type of other data may include record data, which may be stored, for example, at a record data store 265 at and/or associated with an external facility, such as one having provided an electronic request to perform an analysis or assessment pertaining to a client and/or one as identified via input at a client device 230. To illustrate, the other data may identify one or more client reported experiences and/or evaluation results for a client or may include a result of one or more tests.

In some instances, other data may include data pertaining to a different client. For example, it may be determined or estimated that a given client is related to another client. Such determination or estimation may be based on inputs detected at a client device identifying one or more family members (e.g., by name), and a data store may be queried to determine whether any clients match any of the family member identifications. Such relationship determination or estimation may alternatively or additionally be based on a data-set analysis, such that a raw or processed data set from the given client is compared to a raw or processed data set from some or all other clients to identify, for example, whether any other clients share a threshold portion of a data set with the client. Upon detecting an above-threshold match, a percentage of value matching may be used to estimate a type of relationship between the clients.

Upon identifying a related client, other data corresponding to the related client may be identified. Such data may be informative in assessing a client's likelihood for transitioning into a state, as it may be analogous to evaluating a family-history of states. To illustrate, if a client's sister has a sparse indicator that indicates that the sister is highly likely to transition into a given state, this likelihood may influence the client's likelihood assessment in a manner similar to that which an indication that the sister had transitioned into the given state would have, though a magnitude of influence may differ.

In some instances, other data may include, for example, genetic-data, data set availability-data, inputs, record data, data indicative of activity or status, or data derived thereupon that corresponds to one or more different clients with a shared characteristic. For example, a set of clients that share a given client's birth city or childhood city may be identified. Likelihood analyses from the set of clients may be informative for the client, as an environmental factor may have influenced a probability of transitioning into a given state.

In various instances, the other data may be transmitted 355 to assessment system 205 prior to any, or in response to a, request 350 from assessment system 205 for such. For example, client input other data may be provided as part of a preliminary request from client device 230 and record data may be provided as part of an electronic request from requestor device 210a. As another example, upon receiving a preliminary request from a client device, assessment system 205 may request that a client authorize access to data stored on the client device, such that it may be (e.g., via an application) retrieved and transmitted to assessment system 205.

Thus, assessment system 205 may have access to, for a given client, one or more data sets, data set availability modification data, client-reported data, record data, test data, activity data, and/or other types of data. These data may be detected, assessed, or otherwise evaluated, at block 360, such as in one or more assessment processes. Data sets may be evaluated to detect and assess sparse indicators, for example, as described below in further detail. The detection and/or assessment at block 360 may be performed, for example, partly or fully at assessment system 205. In some instances, the detection and/or assessment at block 360 is performed in a fully automated manner. In some instances, the detection and/or assessment at block 360 involves processing of inputs provided by a reviewer or evaluator.

Generation of a report, at block 390, may be performed using the results of data assessment of block 360. A report transmission 395 may include the report and be transmitted to client 225 or facility 220, such as by way of client device 230 or requestor device 210a.

Some embodiments relate to receiving a data set that corresponds to a client. As one example, the data set may include a sequence in each of one or more sequence reads (e.g., data vectors) generated using a sample of the client. The data set can include individual data vectors, which may include a genetic sequence and/or series of bases. Each data vector can be aligned to a portion of a reference data set (e.g., corresponding to a part or all of each of one or more units or data-set units, such as of one or more genes). One or more sparse indicators may be generated, each corresponding to a difference between one or more data vectors and a corresponding portion of the reference data set. A sparse indicator may be associated with one or more positions indicating where the difference is and/or one or more values indicating how the data set differs from the reference data set. As one example, a sparse indicator may correspond to a variant, such as a SNP or structural variant (e.g., a copy number variation). Each sparse indicator may be assigned to a bucket of a plurality of buckets. As one example, each of one, more or all of the plurality of buckets can represent a degree to which associated sparse indicators are pathogenic. In some instances, as a part of a bucketing process, a communication exchange with a device can be initiated that provides information about the sparse indicator and/or that includes one or more queries pertinent to a bucketing work flow (e.g., corresponding to the ACMG guidelines). A bucket assignment can be generated using one or more response communications including one or more query responses. A result for a client (e.g., corresponding to a risk of transitioning into a particular condition state, such as one for developing a condition, such as a type of cancer) can be generated based on, for example, how many and/or which sparse indicators are assigned to one or more particular buckets.

Figure 4:
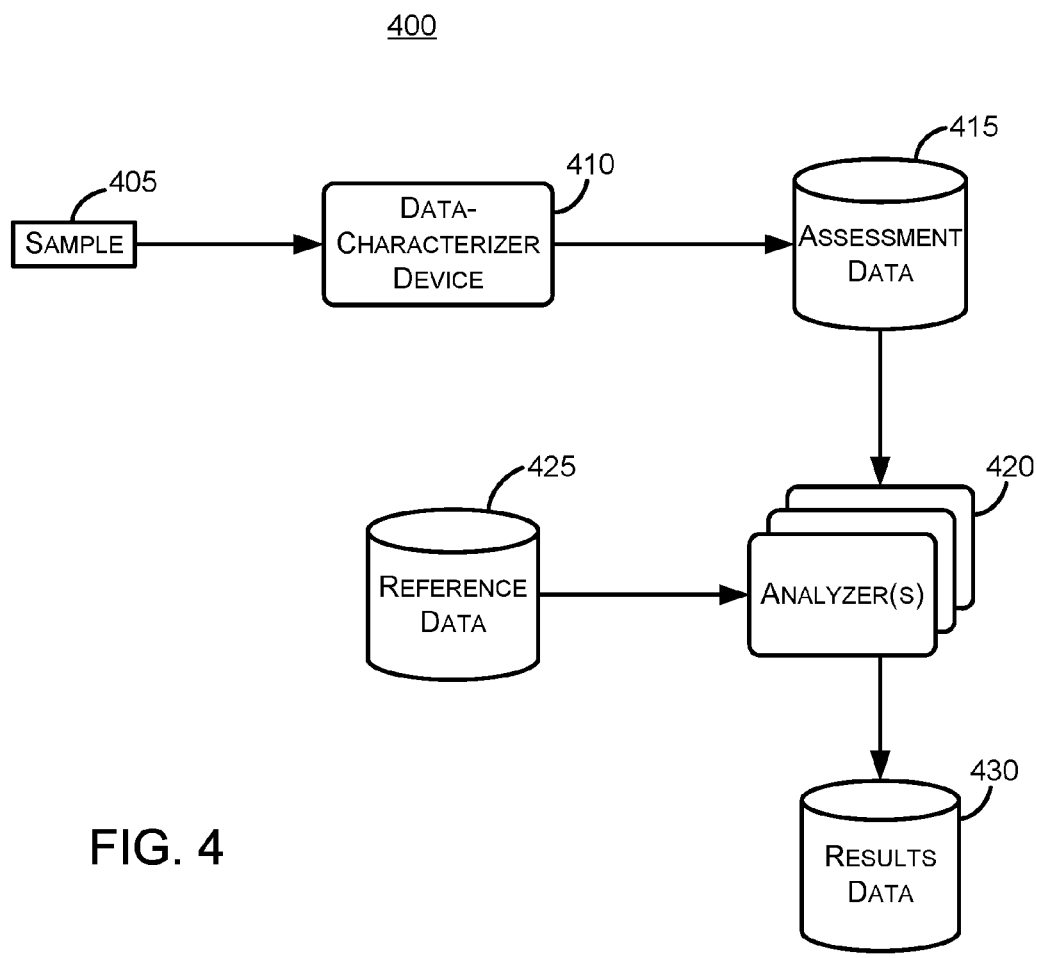
FIG. 4 shows a data flow, in accordance with some embodiments.

Turning next to FIG. 4, an data flow embodiment 400 is shown. Initially, a test material 405 is obtained from a client. As described above, the material 405 may be obtained directly by the client using a collection kit. A client may be able to obtain the material themselves, particularly if the material is easy to collect. Alternatively or additionally, material 405 is obtained at a facility. Obtaining material 405 at a facility may be useful if the material is more difficult to obtain, or if chain-of-custody is a concern.

Material 405 is assessed by a data-characterizer device 410 (e.g., a sequencer that generates a plurality of data vectors, each corresponding a part of a reference data set, such as a genome or epigenome). As the data vectors are determined, they may be stored in data store 415 for subsequent analysis.

Data-characterizer device 410 and data store 415 may be located at a same location, such as a facility. Alternatively, data-characterizer device 410 and data store 415 may be remote from one another. In such a configuration, transmission of data vectors from data-characterizer device 410 to data store 415 may occur using any of a variety of data communication standards and/or protocols. In one example, data vectors are transmitted from data-characterizer device 410 over a wired and/or wireless network to reach data store 415. In another example, data vectors are stored by data-characterizer device 410 directly to a storage medium, such as a flash or hard drive, which may be used to facilitate relaying data vectors to remote data store 415. Optionally, data store 415 may comprise the storage medium. Data vectors stored in data store 415 may be analyzed by data vector analyzer 420. Data vector analyzer 420 may be located at a same or different location from data-characterizer device 410 and/or data store 415.

Depending on the particular configuration, data vectors generated by data-characterizer device 410 and/or stored in data store 415 may be analyzed individually, in real-time as the data vectors are produced, or in batches, such as upon completion of a plurality of data vectors. Data vector analyzer 420 may utilize reference data stored in reference data store 425 in analysis of the data vectors generated by data-characterizer device 410 and/or stored in data store 415.

A variety of analyses may be performed on the data vectors by data vector analyzers 420. For example, data vector analyzer 420 may align each data vector to a portion of one or more reference vectors. Upon completion of the analysis, the information corresponding to the data vectors (e.g., data-vector identifiers) and/or alignment indications may be transmitted to and/or stored in one or more results data stores 430, which may correspond to a portion of relational database 172.

It will be appreciated that data vector analysis may be resource intensive, and thus a plurality of data vector analyzers 420 may be used during the analysis process to distribute the resource burden, for example, and/or increase the rate at which data vectors may be analyzed. For example, if a plurality of alignments are to be evaluated, such as by determining a potential alignment of an individual data vector against multiple reference data vectors, it may be desirable to distribute the tasks among multiple data vector analyzers 420. Load balancing between a plurality of data vector analyzers 420 may be performed to further enhance the use of resources, for example. Additionally, it may be desirable to compare the data vectors stored in data store 415 against multiple reference data vectors, such as from related family members or from people sharing one or more characteristics, as described above, and comparisons of the data vectors with different reference data vectors may be performed by different data vector analyzers.

Additionally or alternatively, data vectors may be analyzed by one or more data vector analyzers 420 to identify one or more sparse indicators. Additionally or alternatively, data vectors may be analyzed by one or more data vector analyzers 420 to categorize each data vector, alignment, or detected sparse indicator. Additionally or alternatively, data vectors may be analyzed by one or more data vector analyzers 420 to score each data vector, alignment, or detected sparse indicator. Again, sparse indicators, data buckets, categories, and scores may be transmitted to and/or stored in results data store 430, which may be included in relational database 172.

Detecting sparse indicators may include aligning each data vector with a reference data vector. The reference data vector may include part of a full reference data set and/or may include a data vector identified based on identifying median or mode data elements across a plurality of data vector derived from samples from a population. In some instances, an alignment is determined to be accurate throughout the data vector, and differences between the data vector and reference data vector can be identified by sparse indicators corresponding to a position (e.g., relative to an axis of the reference data vector or to an axis of the data set) and a value of the data vector (e.g., that differs from a corresponding value in the reference data vector). In some instances, an alignment is determined to be accurate throughout part of the data vector but not for another part. It may then be determined that such partial alignment is attributable to the data vector (for example) lacking representation of a part of the reference sequence or having an additional set of values. A sparse indicator may therefore identify information corresponding to multiple positions (e.g., reflecting a start and stop of a part of a reference data vector not represented in a data vector or the converse) and/or multiple values (e.g., reflecting which values were in one of either the reference data vector or the data vector but not in the other).

Once a sparse indicator is detected it may be assigned a data bucket, which may reflect a predicted impact. For example, data buckets may include a Non-deleterious data bucket and a Deleterious data bucket. Categories may differ in terms of confidence of an impact (or lack thereof). For example, potential categories may include a Non-deleterious data bucket, Likely Non-deleterious data bucket, Likely Deleterious data bucket, and Deleterious data bucket. A data bucket may be determined based on, for example, a stored association between a sparse indicator identifier and data bucket identifier, a prediction as to whether or how a sparse indicator would change a function of a corresponding protein and/or other factors. In some instances, a particular sparse indicator has been previously associated with a definitive data bucket (e.g., Deleterious or Non-deleterious), and this data bucket may be used for subsequent detections of the sparse indicator. In some instances, a particular sparse indicator has been previously associated with a non-definitive data bucket (e.g., Likely Deleterious, Likely Non-deleterious, or Unknown), and this data bucket may be used for subsequent detections of the sparse indicator or the data bucket or the data buckets may be reassessed.

If a sparse indicator has not been previously associated with a data bucket or if a data bucket is to be reassessed, an automated or semi-automated process may be used to identify a data bucket for the sparse indicator. The automated or semi-automated process may use (for example) a virtual structural representor, a component defined at least in part based on machine learning (e.g., a neural network) and/or a crawler of one or more data stores (e.g., a journal-article data store or particular journal data stores). For example, a virtual structural representor may use one or more characteristics pertaining to the sparse indicator to predict (e.g., using a static or dynamic model) an outcome on a unit structure, data element, or corresponding functional element. As another example, a crawler may detect addition of new content objects (e.g., research content objects) at a data store and determine whether any of the content objects correspond to a sparse indicator of one or more units of interest. If so, an identifier of a given content object (e.g., a link) may be tagged with an identifier of a data-set unit of interest and an identifier of a sparse indicator. The content object may be semantically assessed to automatically generate a data bucket for the sparse indicator, or an identifier of the content object may be presented as being potentially relevant at a reviewer device when an automated process does not result in a finalized result for a processing stage.

It will be appreciated that an automated component (e.g., a virtual structural representor, a neural network, or a crawler) may automatically generate a result of a processing stage (e.g., that is part of a work flow entered upon a determination that a bucket for a sparse identifier has not been previously defined or has not been previously defined with an above-threshold confidence). The automatic result may, or may not, be finalized and/or associated with an above-threshold confidence. In an instance in which the automatic result is finalized and/or is not associated with an above-threshold confidence, the result may be stored and/or a stage of a process and/or work flow may automatically progress to a next stage (e.g., the next stage being identified based on the result). The next stage may include performing another type of processing for the sparse indicator or assigning the sparse indicator to a bucket. In an instance in which the automatic result is not finalized or is not associated with an above-threshold confidence, the automatic result may, or may not, be transmitted to a reviewer device, and a finalized result (e.g., for a given processing stage) is identified based on a response communication received from the reviewer device. In some instances, a result is neither locally finalized nor is it transmitted to a reviewer device. Instead, a query (e.g., with or without potentially pertinent information) may be transmitted to the reviewer device.

A given sample may correspond to no sparse indicators (e.g., such that data vectors or part thereof aligned to one or more particular portions of the reference vector match the reference vector or such that values from each data vector match the corresponding values in the reference vector), a single sparse indicator, or a set of detected sparse indicators. Each of the set of detected sparse indicators may be assigned to a data bucket. Reports to a client may be generated based on the sparse indicator data buckets. In one instance, a template is selected based on, for example, a data bucket along a deleterious scale. For example, all available data buckets may be ordered along a scale, and a data bucket at a highest position along the scale may be identified for a given sample. To illustrate, a data bucket may be identified as being "Deleterious" if a sample includes any sparse indicators assigned to a Deleterious data bucket, while a data bucket may be identified as being "Likely deleterious" if a sample includes at least one sparse indicator assigned to the Likely Deleterious data bucket but none to the Deleterious data bucket. In some instances, one available data bucket is an "Unknown" data bucket. An unknown data bucket may, but need not, be positioned along the scale. For example, it may be positioned such that it is to be a data bucket if no Likely Deleterious or Deleterious data buckets are detected but an Unknown data bucket is.

As an example, a report or communication template for an instance where a set of sparse indicators included a Deleterious sparse indicator may include a communication form or text for informing others of a state transition likelihood. As another example, a report or communication template for an instance where a set of sparse indicators included an Unknown sparse indicator may include a communication form or text encouraging related clients to participate in similar assessments to potentially further assess the unknown sparse indicator.

A report may be generated based on a report or communication template and sparse indicator data, characteristics, bucketing information, and optionally other data. The report may identify one, more or all sparse indicators detected and their corresponding data buckets. The report may include identifications of one or more content objects that support a data bucket determination of a sparse indicator and/or provided further information about a sparse indicator. In some instances, such content-object identifications are not presented in an initial view of a report but may be presented in response to, for example, detection of an interaction with the report that corresponds to a request for such information.

In some instances, a state transition likelihood associated with a particular deviation (e.g., sparse indicator) and/or with a combination of deviations is unknown or is associated with a below-threshold confidence. With reference to FIG. 3, upon detecting such a deviation or combination (or a threshold quantity thereof), the particular deviation and/or combination may be identified in a review-request communication 365 and transmitted to an evaluation device 270. Evaluation device 270 may then present the identification to an evaluator 275 and detect input that is indicative of an estimated likelihood to associate with the deviation and/or combination, for example, as part of an optional review analysis process. A review-request response 385 may be transmitted from evaluation device 270 to assessment system 205, for example, to provide the results of any review or input generated by an evaluator 275. The data included in review-request response 385 may be used in report generation process of block 390 and may be included and/or otherwise influence the content of the final report transmitted in report transmission 395.

One or more review-request communications 365 may include representations of pertinent data, results from application of one or more machine-learning techniques, identifications of one or more potentially relevant content objects, and/or one or more queries. For example, a review-request communication 365 may identify a sparse indicator and information about the sparse indicator, such as a corresponding data-set unit, type of sparse indicator, and position within the data-set unit. The communication 365 may further include predictions generated (e.g., based on one or more machine-learning techniques and/or one or more virtual structural representors), such as a prediction as to whether the sparse indicator will affect a function or structure of a unit structure, data element, or corresponding functional element. A machine-learning technique may include a semantic-analysis technique that, for example, searches for words and/or phrases pertaining to potential sparse indicator impacts and assigns weights to associated potential predictions based on a distance between any identified word and an identifier of a sparse indicator and/or whether the word or phrase is separated from an identifier of the sparse indicator with a negative word. A virtual structural representor may include a modeling technique that models how a sparse indicator will impact a unit structure, data element, or corresponding functional element.

As another example, a review-request communication 365 may include an identifier of each of one or more content objects that pertain to a sparse indicator. The identifier may include, for example, a citation and/or a link to the content object. Each of the one or more content objects may relate to (or potentially relate to) a study of a prevalence of a sparse indicator, an impact of a sparse indicator on a unit function, an impact of a sparse indicator relating to transitioning into a particular state, an impact of a sparse indicator on a unit structure function or structure, data element function or structure, or functional element function or structure, etc.

In some instances, a review-request communication 365 organizes data (e.g., data-set unit data, sparse identifier data, machine-learning results, content object identifications and/or objects) into one or more presentations. For example, in one instance, each of one or more review-request communications corresponds to a webpage. In some instances, evaluation device 270 organizes data for local presentation, such as for part of an optional review analysis process.

If necessary, an evaluator 275 may make use of additional data, such as an article, content object, supplemental reference data vector information, and reference categorizations, for example, as part of an evaluation process. If the additional data is not immediately available on evaluation device 270, the reviewer may instantiate the transmission of an additional data request 370 from reviewer device to an external system 349, which may be the same or different from external system 349 referred to above with respect to obtaining other data. The additional data may be provided from the external system 349 to the evaluation device 270 in one or more additional data responses 375, and may be included, for example, in a presentation made at evaluation device 270.

A presentation may, for example, include a simultaneous identification of data (e.g., identifying a data-set unit and sparse indicator) and/or one or more queries (e.g., identified via a categorization work flow). A same or different presentation may include identifications of one or more content objects, which may potentially relate, for example, to a query or stage in the one or more queries or stages (e.g., as determined based on a semantic analysis or other-learning technique). For example, a content object may include one associated with a same type of metadata as existed for another content object relied upon to assign a data bucket for a similar sparse indicator.

In some instances, data bucket assignment of a sparse indicator includes detecting and/or determining results to each of multiple queries or stages (e.g., of part or all of a work flow or processing). In some instances, whether at least one query or stage is relevant to a data bucket assignment depends on a response identified or determined with respect to a previous query or stage. For example, the ACMG framework may be used for the data bucket assignment, which can correspond, at least in part, to the techniques described by Richards et al. In Genetics in Medicine (2015), 17, 405-423 (doi:10.1038/gim.2015.30) and its supplementary information, each of which is hereby incorporated by reference. It will be appreciated that one or more stages or queries useful in aspects described herein may correspond to, follow all or portions of, or take into consideration this framework and/or other frameworks for similar types of bucketing.

In some instances, a response to each of at least one, more or all queries is automatically determined. In some instances, a response to each of at least one, more, or all queries is automatically identified and presented as a suggested response that requires a reviewer or evaluator approval for finalization of the response. Each suggested response may even be accompanied with a confidence indicator and/or data relied upon to produce the suggested response. Such automated determination of an actual or suggested response may be made based on a machine-learning technique, model, prediction technique, prior classification, position or type of sparse indicator, and so on.

A presentation may be dynamic and/or interactive. For example, a display may be updated based on what input was received from a reviewer device. The update may include, for example, presenting new queries or identifications of content objects.

Input provided by an evaluator 275 at evaluation device 270 may include a response to one or more queries. A response may include, for example, a yes/no answer, selection amongst a set of options, or a number. In some instances, at least one query or response, or all queries or responses, may require or may permit indication as to why a given response was provided. The indication may include, for example, text, selection of one or more (previously identified) content object identifications, identification of another content object (e.g., via provision of a citation or html link) or selection amongst one or more support options (e.g., article, data analysis, etc.).

In some instances, input provided at evaluation device 270 includes identification of a data bucket. In some instances, input provides information that may be used to identify a data bucket. For example, responses to one or more queries in a data bucket assignment work flow may indicate to which data bucket a sparse indicator is to be assigned without explicitly identifying the data bucket.

In some instances, multiple evaluators 275 are involved in assigning a sparse indicator to a data bucket. For example, a first evaluator may provide an initial assessment of a sparse indicator (e.g., identifying responses to one or more queries, identifying one or more content objects as being pertinent to a query or data bucket assignment, and/or characterizing one or more content objects). A second evaluator may then repeat the assessment or review the first evaluator's initial assessment to determine whether the second evaluator finds agreement with the provided inputs.

When multiple evaluators are involved, it may be, for example, that the two evaluator find agreement in the entirety of the assessment (e.g., all responses and/or support identifications), find agreement with respect to at least some of the assessment (e.g., pertaining to particular queries), or provide assessments that result in a same data bucket assignment. In one instance, one of the review assessments may be performed based on machine learning. In one instance, one of the review assessments may be performed based on or use of a virtual structural representor. For example, responses to one or more queries may be provided based on a semantic analysis of one or more content objects.

A result generated by assessment system 205 may include a quantitative or qualitative (e.g., categorical) likelihood variable. For example, the likelihood variable may include a percentage probability or range of transitioning into a particular state. As another example, the likelihood variable may be partitioned into three categories (deleterious, unknown, non-deleterious).

Assessment system 205 may generate an electronic report, at block 390, that includes the result and/or that is selected based on the result. A report communication or transmission 395 may include the report and be transmitted to client 225 or facility 220, such as by way of client device 230 or requestor device 210a. For example, different preventative-measure content may be included in reports depending on a likelihood data bucket. As another example, a report may identify one or more deviations (e.g., one or more sparse indicators) and/or corresponding normal bases, ranges, data, and so on. A report may identify a state pertaining to an analysis (e.g., a likelihood analysis for transitioning into a specific state). A report may identify types of data (e.g., particular data-set units and/or other type of data) used in the analysis. A report may identify a confidence in a result (e.g., a likelihood variable). A report may identify a recommendation (e.g., to contact a requestor or to receive a particular test or evaluation).

A report may include identifications of one or more content objects or databases relied upon to arrive at a data bucket (e.g., a Deleterious or Likely Deleterious data bucket) of a particular sparse indicator. Such content-object identifications may be provided, for example, upon detecting input requesting identification of the support or automatically.

In some instances, a report must be approved (e.g., by a requestor 215a or 215b) before it is transmitted to a client device 230. A report-reviewing interface may, but need not, include a configuration to allow a reviewing entity to change or add to the report. A report-reviewing interface may further allow or require a reviewing entity to identify a time at which to send the report to a client.

Assessment system 205 may update and may have access to a variety of data stores, part or all of which may be remote from, co-localized with assessment system 205, and/or included in assessment system 205. One or more of the data stores may include a relational data store, such that data from one data store or structure within a data store may be used to retrieve corresponding data from another data store or structure.

Each of one, more, or all of the data stores may be associated with one or more access constraints. Access constraints applicable to a given data store may be stored as part of the data store or separately (e.g., in an access control data store). Access constraints that apply to one type of data may differ from access constraints that apply to another type of data. For example, account and client data may be associated with stricter access constraints than results data, to make it more difficult for a user, developer or hacker to be able to link data to a particular individual. An access constraint may identify one or more individuals, devices, systems, and/or occupations permitted to access some or all data in a data store. An access constraint may include a rule, such as one that indicates that a user is permitted to access data pertaining to any of a group of users that the entity was involved in with respect to a transfer of a kit, or that indicates that any low-level authorized user is permitted to access de-identified data but not identifiable data, or that indicates that a high-level authorized user is permitted to access all data. As another example, access constraints may indicate that process data is to be hidden from external developers and available to internal users; that data-set unit, sparse indicator, and data set availability data is to be made available to all authorized external developers and internal users; and that client data is to be availed to authorized internal users and only availed to external developers to the extent to which each corresponding users represented in the data is a user of the developer (e.g., and that the client authorized such data access).

When different access rights apply to different types of data, a query protocol may be established to address instances where a query relates to each type of data. For example, a query may request Variable X for each client corresponding to Data Y, and Variable X and Data Y may correspond to different access constraints. As another example, a query may request a count of client for which both Data Y and Data Z was detected, and Data Y and Z may correspond to different access constraints. One example of a query protocol is to use a most restrictive overlap of data constraints applying to the query. Another example of a query protocol is to permit use of an at least partly more relaxed access constraint so long as it relates to defining a client set or state and not to results to be returned or processed.

In some instances, an access constraint is configured to inhibit an identification of particular data (e.g., client identity). Such a constraint may relate to a precision of requested data. To illustrate, a constraint may be configured to permit a user to request and receive data identifying client locations, so long as the request is configured to not request too specific of a location and/or so long as the request corresponds to a number of client data elements sufficiently large to obscure (e.g., in a statistical result) a precise location. Compound queries may be more sensitive to potential identification concerns, such that one or more access constraints are configured to permit access to less precise data when multiple data elements are being requested.

The data stores may include, for example, an account data store 276, which may include login credentials for one or more users or clients and/or types of data access to be granted to each user or client; process data store 277, which may identify facility analysis characteristics pertaining to particular data elements (e.g., identifying a facility, piece of equipment, and/or processing time); data sets data store 278, which may identify one or more data vectors associated with a given client or material, such as a sample; and one or more data-vector expressions or signatures associated with a given client or material, such as a sample. The data stores may further or alternatively include a results data store 281, which may identify one or more deviations identified by and/or one or more results generated by assessment system 205 that are associated with a given client or material, such as a sample.

The data stores may further or alternatively include a reports data store 282, which may include one or more report templates (e.g., each associated with one or more result types) and/or one or more reports to be transmitted or having been transmitted to a client device; and/or a relevance support data store 283, which may identify which types of data (e.g., data-set units, full or partial reference data sets, activity patterns, inputs, records, tests, etc.) are established to be, potentially, established not to be, or unknown whether to be relevant for evaluating a particular type of likelihood (e.g., a likelihood of transitioning into a particular state).

Relevance support data store 283 may include identifications of one or more content objects, such as content objects. The identifications may include, for example, web addresses, journal citations or article identifiers. In some instances, an identification identifies one or more sources associated with the content object (e.g., scientist, author, journal, or data store). Content objects may be tagged with one or more tags, which may identify, for example, a sparse indicator, a data vector, and/or a type of assessment. In some instances, each of one or more content objects are associated with a score which may reflect a credibility of the content object. The score may be based, for example, on a publication frequency of a source, an impact factor of a source, a date of publication of the content object, and/or a number of citations to the content object.

It will be appreciated that the illustrated data stores 255, 265, 276, 277, 278, 281, 282, and 283 may each, independently and optionally, be included as a portion of relational database 172.

Assessment network 200 may also include a user device 280 configured to detect input from a user 285. User 285 may be associated with an account or other authentication data indicating that access to some or all of the data is to be granted. Accordingly, user 285 may be able to interact with various interfaces (presented at user device 280) to view data pertaining to one or more particular clients (e.g., in an identified or de-identified manner), to view summary data that relates to data from multiple clients, to explore relationships between data types, and so on. In some instances, an interface may be configured to accept inputs from a user 285 so as to enable the user to request data pertaining to materials with sparse indicators in particular data-set units, particular sparse indicators, state likelihoods, trait information, symptom presence, and/or family-history patterns.

In some instances, data is transmitted by assessment system 205 and received at user device 280. The transmitted data may relate to durations of work flow processing time periods. Specifically, as may be appreciated by disclosures included herein, generating outputs for users and/or requestors may involve multiple steps, each of which may include a process, which may be referred to herein as a task, of an entity and/or device. Completion times of individual processes may then be monitored and assessed. A work flow may include a structure and definition for these processes. For example, various work flows may include some or all of the following tasks:

Inputs are collected at client device 230, transmitted by client device 230, and received by assessment system 205, where the inputs correspond to a preliminary request to conduct an assessment based on a material and ensure that all required inputs have been received (e.g., identifying and contact information, medical-history data, family medical-history data, payment information, and/or identification of states for which likelihoods are requested);

A same or different client device 230 (e.g., a wearable device) collects and transmits other data indicative of the client's activity or status;

Inputs collected at requestor device 210a, 210b and transmitted to assessment system 205 that correspond to a request for assessment for the client;

Access control device 260b at facility 220 collects and transmits record data of the client;

Distribution device 235 receives alert corresponding to new request and address information and confirms shipping of kit for sample collection to the client;

Client 225 receives kit, collects sample and sends to data generator 240;

Assessment device(s) 245 collect data-set data, and access control device 260a sends facility data to assessment system 205;

Assessment system 205 detects any sparse indicators in data vector(s) and/or any modifications in data vector expression;

Assessment system 205 assigns any sparse indicators and/or data set availability modifications to data buckets (e.g., as deleterious, non-deleterious, or unknown);

Evaluation device 270 collects inputs identifying a data bucket assignment of any sparse indicators and/or data set availability modifications with an unknown data bucket;

Confirmatory facility testing of any sample associated with a sparse indicator and/or data set availability modification having a data bucket assignment as being deleterious at same or different facilities;

Assessment system 205 aggregates sparse indicator data bucket assignment data, record data, user or client inputs and/or activity or status data and generates one or more likelihood variables;

Assessment system 205 generates electronic report with the one or more likelihood variables;

Evaluation device 270 and/or requestor device 210a collect inputs indicating that the electronic report is approved for transmission to client device 230; and Assessment system 205 transmits the electronic report to client device 230.

A work flow may include a task order that indicates that, for example, a first task is to be completed prior to performance of a second task, though a work flow may alternatively be configured such that at least some tasks may be performed in parallel. In some instances, one or more tasks in a work flow are conditional tasks that need not be performed during each iteration of the work flow. Rather, whether a conditional task is to be performed may depend on a circumstance, such as whether a result from a prior task is of a particular type or exceeds a threshold (e.g., such that confirmatory facility testing is only performed if a sparse indicator is detected and has a data bucket assignment of deleterious and/or if a facility quality metric included in the facility data is below a threshold).

Using a work flow, assessment system 205 may track timing of individual tasks during individual iterations of a work flow. Each iteration may correspond to generating a likelihood variable for a given client and may involve various other entities (e.g., reviewers, facilities, etc.), which may be selected based on, for example, user preference, a physical location of a client device, and/or availability. For tasks performed at assessment system 205, timing may be directly determined. For tasks performed by, at, and/or via another device, assessment system 205 may track timing via electronic transmissions between systems. For example, a start may be identified by an instruction communication sent from assessment system 205 and/or a when a communication was received indicating that the corresponding task was beginning. As another example, an end time may be identified by transmission of a communication including a result of the corresponding task sent from assessment system 205 and/or when a communication was received indicating that the corresponding task was complete.

Figure 5:
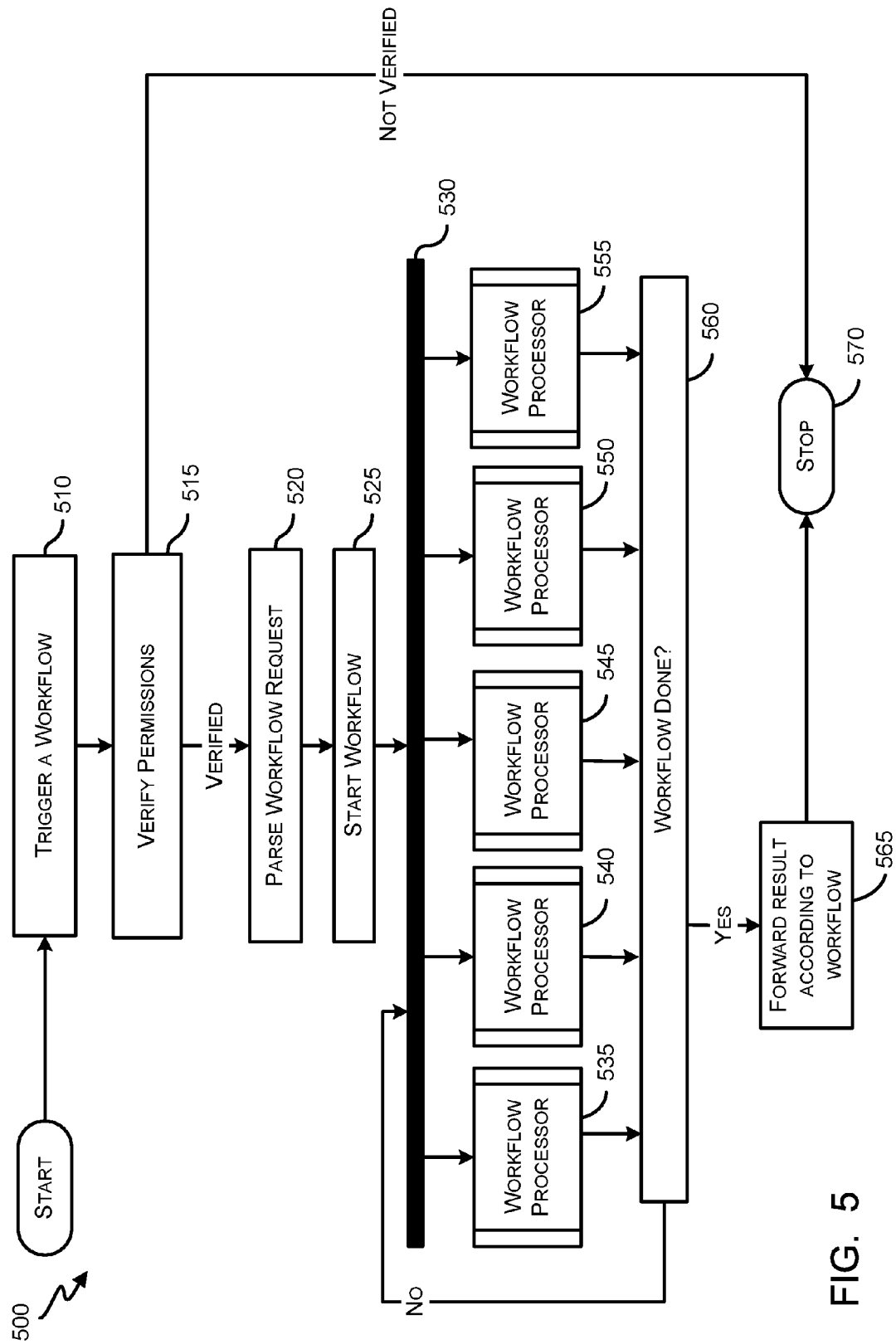
FIG. 5 shows an illustration of a work flow iteration, in accordance with some embodiments.

FIG. 5 shows a representation of an embodiment of a process 500 for processing tasks in the assessment network 200. The process starts when an event triggers a first work flow as shown at block 510. Any number of events occurring internal to the assessment network 200 and external to the assessment network 200 may trigger a first work flow in any number of ways. Each of the assessment system 205, a requestor device 210, a client device 230, a distribution device 235, a facility data generator, an evaluation device 270, a user device 280, and an external assessment device 290 may trigger a work flow, for example. For instance, the assessment system 205 may trigger a work flow when it receives an electronic request 305. A requestor device 210 may trigger a work flow by transmitting electronic request 305. A user device may trigger a work flow based on inputs collected. A data generator 240 may trigger a work flow upon receipt of a sample. Other examples are possible and it will be appreciated from the present description that any one or more data transmissions between various devices and systems of assessment network 200 may trigger a work flow. It will also be appreciated that various work flows may initiated sequentially or simultaneously, depending on the particular need for completion of one work flow to complete before another work flow may begin. In addition, additional work flows may be triggered while in the midst of processing one work flow. In some embodiments, an assessment system or assessment device manages and/or coordinates triggered work flows. Optionally, task start times may be tracked, as described above, and triggering a work flow may include tracking the start time of tasks associated with the work flow.

Some task work flows may require verification of permissions and/or authorizations, such as depicted at block 515, before the work flow is permitted to begin. For example, a transmission of record data of a client may require explicit authorization from a client or a requestor before the transmission may begin, for example, due to the sensitivity of information that may be included in the record data. As another example, transmission of information of a client to an external assessment device may also require client permission. In this way, permission verification may prevent unanticipated or unauthorized transmission of information to a particular work flow processor for which such transmission may be undesirable. Timing of permission request and verification may further be tracked, such as to allow identification of bottlenecks in work flow and/or task processing associated with permission verification.

As illustrated in FIG. 5, if permissions are not verified, the work flow may be stopped, at block 570. If permissions are verified, the work flow may proceed to block 520. It will be appreciated that not all work flows require permission verification, and so block 515 may be considered to be optional.

Depending on the particular work flow initiated, the work flow request may require parsing, at block 520, to ensure that various portions of the work flow may be handled appropriately. Parsing may include determining that all required inputs, data, and/or materials needed for completing the work flow are available. In the event that additional inputs, data, and/or materials are needed, the work flow may be returned to the triggering device to request the additional inputs, data, and/or materials, for example. Parsing may also include aspects of load-balancing. Parsing may also include, for example, analyzing the work flow request and associated data and/or materials to ensure the data, materials and/or multiple individual sub-work flow processes are directed to an appropriate work flow processor 535, 540, 545, 550, 555, etc. Task start times may optionally be tracked based on completion of parsing a work flow request, for example.

In one embodiment, a work flow may correspond to performing a data vector analysis on a sample, which may include dividing the sample into sub-samples. The sub-samples may, for example, be redundantly analyzed to ensure accuracy. Parsing 520 may include identifying necessary resources for completing a particular work flow.

After parsing the work flow request, the triggered work flow is started, at block 525. Optionally, synchronizer 530 oversees the processing of individual work flow processes by work flow processors. Optionally, tracked task start times may correspond to times at which the triggered work flow is actually passed to a work flow processor.

Some task work flows may include multiple individual work flow processes, such as a sequencing work flow for sequencing data-set unit data or sparse indicator data from a sample, where each individual work flow process may correspond to, for example, one or more data vectors. These individual work flow processes may be performed in series, for example, such as if a particular work flow process requires input from a previous work flow process. The individual work flow processes may alternatively be performed in parallel, for example, if the separate work flow processes do not rely on an a result from another work flow process that may be performed simultaneously. Additionally, individual work flow processes may be started and completed without regard to other work flow processes that may be operating. Upon a work flow processor 535, 540, 545, 550, 555 completing the designated tasks, at 560, the work flow may be evaluated to determine whether the work flow is completed. If additional processing is required, the work flow may return to synchronizer 530 for appropriate queuing. If no additional processing is required, the work flow result may be forwarded as appropriate, at 565. Once a particular work flow is forwarded, the task associated with the work flow may stop, at block 570. Optionally, task stop or end times may be tracked based on the time at which a work flow proceeds to stop at block 570.

Assessment system 205 may store task start and completion times, and/or task completion time periods (i.e., a difference between corresponding task completion and task start times) in process data store 277 in association with an identifier of the corresponding task and an identifier of a corresponding work flow iteration (e.g., an identifier of a client or sample). Assessment system 205 may collect task start and completion times that correspond, for example, to a given time period, facility, user or client group, analysis type, etc. and analyze the data at a population level. Through such analysis, assessment system 205 may identify average, median, or mode completion time periods for individual tasks so as to identify tasks, facilities, or entities associated with work flow processing delay. Further or alternatively, assessment system 205 may identify a backlog for individual tasks by identifying a number of "open" tasks for which a start time has been identified but for which no completion time is identified. Tasks, facilities, and/or entities associated with high backlog may then be identified.

Such task completion time monitoring may be performed automatically and/or in response to a query communication from user device 280. For example, assessment system 205 may determine, for each handling entity (e.g., facility, distribution device, reviewer, or facility) a portion of tasks completed by a first threshold time identified for a given task. Upon detecting that the portion exceeds a second threshold, an alert communication may be transmitted to user device 280 and/or a device of an associated entity. As another example, assessment system 205 may present a statistic (e.g., mean) corresponding to a processing time of each task in a work flow. The presentation may be interactive, such that more details about a statistic may be presented in response to a user selection of the statistic. For example, the statistic may be broken down by entity and/or task start time period, or more detailed information (e.g., a distribution or list of start and completion times) may be presented.

In some instances, data transmitted from assessment system 205 to user device 280 may relate to data queries received from user device 280. The query may, in some instances, include one that specifically or implicitly identifies one or more data-set units. For example, identification of a given kit or assessment may be associated with one or more data-set units. Assessment system 205 may identify data that any access constraints indicate are accessible to the user, and present high-level population data. For example, assessment system 205 may identify a portion of clients for which any sparse indicator or a deleterious sparse indicator was detected at each of the one or more data-set units. Such data may be presented in an interactive manner, such that a user may select a represented portion of the data to drill down into that data. For example, the interface may accept a selection of a representation of each data-set unit, and the interface may be updated to identify a distribution of particular sparse indicators detected at the data-set unit.

A drill-down may be configured to, at some level, begin representing non-data vector data. For example, a selection of a particular sparse indicator or data-set unit may result in a display identifying a distribution of history data or demographic data from amongst clients associated with the particular sparse indicator or a sparse indicator at the data-set unit. Thus, the drill-down may include retrieving data from different data stores depending on a level of precision. Further, each step in the drill-down may involve evaluating one or more applicable access constraints.

In some instances, a query may pertain to one or more data-set units, and query processing may include retrieving data (or results derived therefrom) and retrieving data set availability data (or results derived therefrom). For example, query processing may include identifying, for each subject and for each of the one or more data-set units, whether a sparse indicator or an data set availability modification was detected. A query result presentation may identify, for example, a portion of subjects for which a sparse indicator or modification was detected for each of the data-set units and/or a query result presentation may identify, for each of the one or more data-set units, a portion of subjects or clients for which a particular type of sparse indicator or modification was detected. The presentation may again be configured to accept drill-down inputs so as to enable a user to further explore the pertinent data.

As another example, query processing may include identifying instances in which, in a given sample, both a sparse indicator (e.g., generally or of a particular type) and an data set availability modification (e.g., generally or of a particular type) was detected (e.g., generally, at a particular data-set unit and/or at a particular position at a data-set unit).

Assessment network 200 may also include an external assessment device 290 configured to detect input from a developer 295. Via such inputs, external assessment device 290 may send electronic requests for genetic and/or other data (e.g., relating to particular data-set units, a particular user or client and/or particular user or client inputs) to assessment system 205. The inputs may be received, for example, via a webpage, application, or app page, which may identify general types of data that is available for restricted access. Assessment system 205 may evaluate the request to determine, for example, whether a corresponding client 225 authorized such access (which may be verified via a communication exchange between assessment system 205 and client device 230) and/or whether such access is relevant to a purported type of analysis.

The evaluation may include assessing one or more permissions associated with a given user or client. In various instances, a permission may be set to be conditioned upon an entity or system transmitting a request, a type of data being requested, a size of data being requested, or a potential type of processing identified as being a use for the data. For example, a client may specify that an external assessment device may be granted access to data, such as data that includes data vectors or sparse indicator detections, if the requested data pertains to fewer than a first threshold number of data-set units, that access to data that includes sparse indicator detection may be granted if the requested data pertains to fewer than a second threshold number of data-set units, and that access to the data is to be otherwise restricted.

Evaluation processing may depend, in part, on whether a system or entity associated with a request has provided any data previously or presently and/or what type of data is being provided. For example, external assessment devices and/or associated systems may provide data (e.g., generated from an external facility and/or client sample), results data, input data, data set availability data, test data, and/or history data.

Evaluation processing may depend on one or more permissions or restrictions associated with a request. The permissions or restrictions may be set, for example, based on client input, or lack thereof, and/or based on which type of analysis and/or data storage was initially agreed to by a client. For example, an interface may be configured so as to enable a user or client to permit or restrict storage of particular types of data (e.g., data vectors and/or sparse indicator detection beyond what is needed to perform a requested analysis), to permit or restrict sharing data to one or more other entities (e.g., generally, of a given type or specific entities), and/or to permit or restrict using data to perform one or more other types of analyses. Permissions or restrictions pertaining to whether various analyses may be particularly important given that rules or regulations may require particular results of analyses to be transmitted to a client. Thus, if such information is not desired, analyses must be restricted.

In some instances, an interface may be configured to enable a user or client to specify a degree of identification to be associated with data of the client with regard to storage and/or distribution. For example, a user or client may be able to indicate that data and/or results are to be associated with a pseudo-randomly generated unique identifier of the client rather than client identifying information. As another example, a client may be able to indicate that data is to be stored so as to require a key for access, which may be held by the client. As another example, a client may authorize transmission of the client's data to external assessment devices so long as identifying information of the client (e.g., name, email, address, social security number, phone number, and so on) is not provided without subsequent explicit permission.

In some instances, a same or different permission may be established to apply to other type of data (e.g., with regard to storage and/or distribution), such as personal data, inputs and/or sensor data. In some instances, a same or different permission may be established so as to relate to data collected from external systems. For example, a permission may indicate whether an assessment system is authorized to request physician-system data (and/or what type of data), an external assessment device-data, etc., and/or how an assessment is to handle results provided by an external system.

If the evaluation indicates that access is to be granted, assessment system 205 may, for example, send an instruction communication to data generator 240 to conduct a new analysis of an existing sample, send a data request to a device (e.g., access control device 260b, client device 230), and/or retrieve data from a data store (e.g., and extract pertinent information from any larger data structure, such as extracting data-set unit-specific data from a reference dataset). When part or all of the data is accessible, one or more communications may be transmitted to the developer. The one or more meetings may include the data and/or may include information (e.g., access credentials, login information, or ftp IP address and credential information) to enable the developer to access the data. In some instances, other data different from that which was requested may be provided. The other data may include, for example, quality control metrics of the provided data, other data determined to be relevant to an analysis, and/or other data that is being provided in lieu part or all of data that had been requested.

Various devices in assessment network 200 may communicate with one or more other devices in assessment network 200 via a network, such as a communication system, the Internet, a local-area network, or a short-range network. Communications may be sent in a secure manner to, e.g., inhibit unauthorized access to health-record data. Techniques such as token authentication and/or encryption may be used.

It will be appreciated that the representations of devices and configurations depicted in FIGS. 1 and 2 are illustrative. For example, while a single data generator 240, client device 230, and data stores 278, etc., are shown, a system may include multiple data generators 240, client devices 230, data store 278, etc. As another example, while access control devices 260a, 260b are shown as being connected to data store 255 and record data store 265, additional access control devices may be present in assessment network 200. For example, an access control device 205 may be included within or connected to assessment system 205 so as to control access that requestor device 210b, client device 230, distribution device 235, evaluation device 270, user device 280 and/or external assessment device 290 may achieve.

Figure 6:
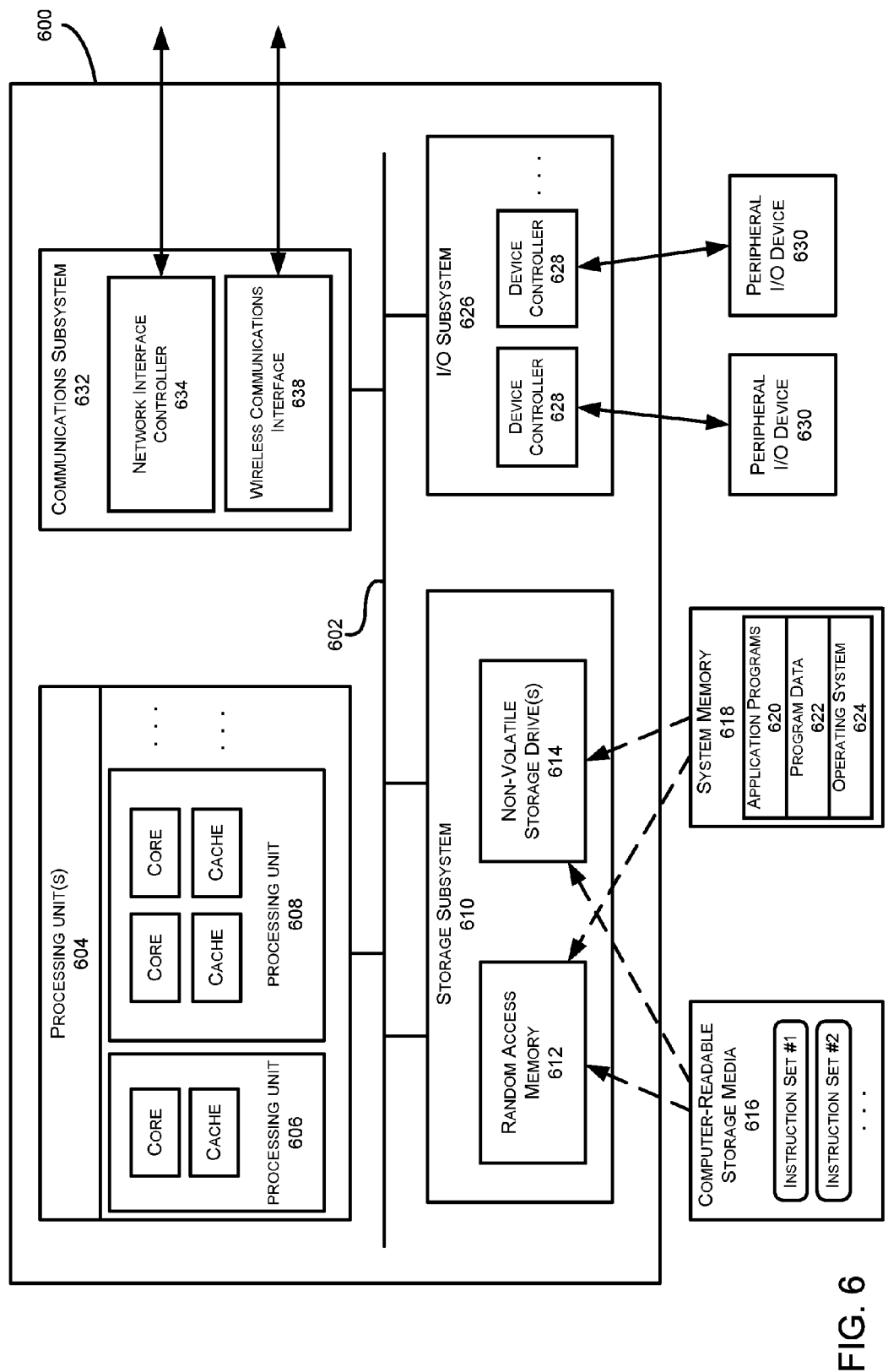
FIG. 6 shows a block diagram of an example data processing network device or system, in accordance with some embodiments.

With reference now to FIG. 6, a block diagram of an illustrative assessment network device 600 is shown. The device 600 may correspond to any of the devices or systems of the assessment network 200 described above, or any other computing devices described herein, and specifically may include, for example, one or several of an assessment system 205, a requestor device 210, a client device 230, a distribution device 235, an assessment device 245, a technician device 250, an access control device 260a, a reviewer device 280, an external assessment device 290, external system 349, data-characterizer device 410, data vector analyzer 420, and/or any of the work flow processors 535, 540, 545, 550, and 555. Aspects of device 600 may further be incorporated in one or more of data stores 255, 265, 276, 277, 278, 281, 282, 283, 415, 425, and 430 and relational database 172. It will be appreciated that each of the devices referred to that may correspond to an instance of device 600 may be independent and unique from all other instances of device 600 and may include fewer or additional components as those illustrated in FIG. 6.

In the example illustrated in FIG. 6, device 600 includes processing units 604 that communicate with a number of peripheral subsystems via a bus subsystem 602. These peripheral subsystems include, for example, a storage subsystem 610, an I/O subsystem 626, and a communications subsystem 632.

Bus subsystem 602 provides a mechanism for letting the various components and subsystems of device 600 communicate with each other. Although bus subsystem 602 is shown schematically as a single bus, alternative embodiments of the bus subsystem may utilize multiple buses. Bus subsystem 602 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard.

Processing unit 604, which may be implemented as one or more integrated circuits (e.g., a conventional microprocessor or microcontroller), controls the operation of device 600. Processing unit 604 may be implemented as a special purpose processor, such an application-specific integrated circuit, which may be customized for a particular use and not usable for general-purpose use. One or more processors, including single core and/or multicore processors, may be included in processing unit 604. As shown in FIG. 6, processing unit 604 may be implemented as one or more independent processing units 606 and/or 608 with single or multicore processors and processor caches included in each processing unit. In other embodiments, processing unit 604 may also be implemented as a quad-core processing unit or larger multicore designs (e.g., hexa-core processors, octo-core processors, ten-core processors, or greater).

Processing unit 604 may execute a variety of software processes embodied in program code, and may maintain multiple concurrently executing programs or processes. At any given time, some or all of the program code to be executed may be resident in processor(s) 604 and/or in storage subsystem 610. In some embodiments, device 600 may include one or more specialized processors, such as digital signal processors (DSPs), outboard processors, graphics processors, application-specific processors, and/or the like.

I/O subsystem 626 may include device controllers 628 for one or more user interface input devices and/or user interface output devices 630. User interface input and output devices 630 may be integral with device 600 (e.g., integrated audio/video systems, and/or touchscreen displays), or may be separate peripheral devices which are attachable/detachable from device 600. The I/O subsystem 626 may provide one or several outputs to a user by converting one or several electrical signals to user perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 630 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 630 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, haptic devices, and eye gaze tracking devices. Additional input devices 630 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 630 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, haptic devices, and the like. In general, use of the term "output device" is intended to include all possible types of devices and mechanisms for outputting information from device 600 to a user or other computer. For example, output devices 630 may include, without limitation, a variety of display devices that visually convey text, graphics and audio/video information such as monitors, printers, speakers, headphones, automotive navigation systems, plotters, voice output devices, and modems.

Device 600 may comprise one or more storage subsystems 610, comprising hardware and software components used for storing data and program instructions, such as system memory 618 and computer-readable storage media 616. The system memory 618 and/or computer-readable storage media 616 may store program instructions that are loadable and executable on processing units 604, as well as data generated during the execution of these programs. Program instructions may include instructions to perform one or more actions or part(s) or all of one or more methods or processes described herein. For example, program instructions may include instructions for identifying and/or aligning sparse indicators. Program instructions may include instructions for bucketing or analyzing sparse indicators. Program instructions may include instructions for analyzing or counting data bucket assignments. Program instructions may include instructions for generating, transmitting, and/or receiving communications. Program instructions may include instructions for automated processing. Program instructions may include instructions for generating automated processing and/or stage results. Program instructions may include instructions for performing a work flow iteration.

Depending on the configuration and type of device 600, system memory 618 may be stored in volatile memory (such as random access memory (RAM) 512) and/or in non-volatile storage drives 614 (such as read-only memory (ROM), flash memory, etc.) The RAM 612 may contain data and/or program modules that are immediately accessible to and/or presently being operated and executed by processing units 604. In some implementations, system memory 618 may include multiple different types of memory, such as static random access memory (SRAM) or dynamic random access memory (DRAM). In some implementations, a basic input/output system (BIOS), containing the basic routines that help to transfer information between elements within device 600, such as during start-up, may typically be stored in the non-volatile storage drives 614. By way of example, and not limitation, system memory 618 may include application programs 620, such as user applications, Web browsers, mid-tier applications, server applications, etc., program data 622, and an operating system 624.

Storage subsystem 610 also may provide one or more tangible computer-readable storage media 616 for storing the basic programming and data constructs that provide the functionality of some embodiments. Software (programs, code modules, instructions) that when executed by a processor provide the functionality described herein may be stored in storage subsystem 610. These software modules or instructions may be executed by processing units 604. Storage subsystem 610 may also provide a repository for storing data used in accordance with the present invention.

Storage subsystem 610 may also include a computer-readable storage media reader that may further be connected to computer-readable storage media 616. Together and, optionally, in combination with system memory 618, computer-readable storage media 616 may comprehensively represent remote, local, fixed, and/or removable storage devices plus storage media for temporarily and/or more permanently containing, storing, transmitting, and retrieving computer-readable information.

Computer-readable storage media 616 containing program code, or portions of program code, may include any appropriate media known or used in the art, including storage media and communication media, such as but not limited to, volatile and non-volatile, removable and non-removable media implemented in any method or technology for storage and/or transmission of information. This may include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This may also include nontangible computer-readable media, such as data signals, data transmissions, or any other medium that may be used to transmit the desired information and that may be accessed by device 600.

By way of example, computer-readable storage media 616 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray disk, or other optical media. Computer-readable storage media 616 may include, but is not limited to, Zip drives, flash memory cards, universal serial bus (USB) flash drives, secure digital (SD) cards, DVD disks, digital video tape, and the like. Computer-readable storage media 616 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for device 600.

Communications subsystem 632 may provide a communication interface from device 600 and remote computing devices via one or more communication networks, including local area networks (LANs), wide area networks (WANs) (e.g., the Internet), and various wireless telecommunications networks. As illustrated in FIG. 6, the communications subsystem 632 may include, for example, one or more network interface controllers (NICs) 634, such as Ethernet cards, Asynchronous Transfer Mode NICs, Token Ring NICs, and the like, as well as one or more wireless communications interfaces 638, such as wireless network interface controllers (WNICs), wireless network adapters, and the like. Additionally and/or alternatively, the communications subsystem 632 may include one or more modems (telephone, satellite, cable, ISDN), synchronous or asynchronous digital subscriber line (DSL) units, FireWire interfaces, USB interfaces, and the like. Communications subsystem 632 also may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.11 family standards, or other mobile communication technologies, or any combination thereof), global positioning system (GPS) receiver components, and/or other components.

The various physical components of the communications subsystem 632 may be detachable components coupled to the device 600 via a computer network, a FireWire bus, a serial bus, or the like, and/or may be physically integrated onto a motherboard or circuit board of device 600. Communications subsystem 632 also may be implemented in whole or in part by software.

In some embodiments, communications subsystem 632 may also receive input communication in the form of structured and/or unstructured data feeds, event streams, event updates, and the like, on behalf of one or more users who may use or access device 600. For example, communications subsystem 632 may be configured to receive data feeds in real-time from other communication services, web feeds such as Rich Site Summary (RSS) feeds, and/or real-time updates from one or more third party information sources. Additionally, communications subsystem 632 may be configured to receive data in the form of continuous data streams, which may include event streams of real-time events and/or event updates (e.g., data vector completion, results transmission, other data transmission, report transmission, etc.). Communications subsystem 632 may output such structured and/or unstructured data feeds, event streams, event updates, and the like to one or more data stores that may be in communication with device 600.

Due to the ever-changing nature of computers and networks, the description of device 600 depicted in FIG. 6 is intended only as a specific example. Many other configurations having more or fewer components than the device depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, it will be appreciated that there are other ways and/or methods to implement the various embodiments.

Figure 7:
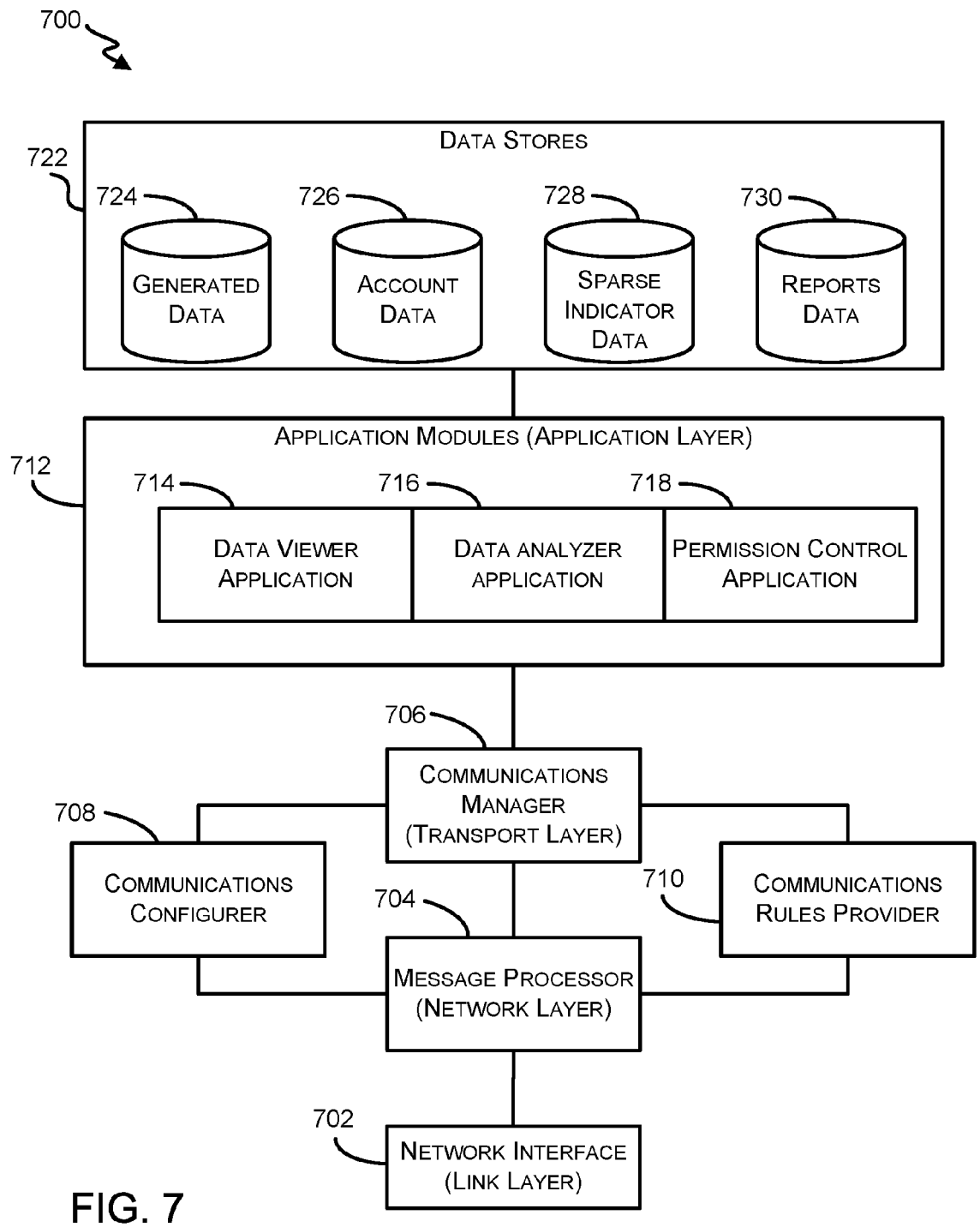
FIG. 7 illustrates components of a data processing network device or system, in accordance with some embodiments.

With reference now to FIG. 7, a diagram of components of an illustrative assessment network device 700 is shown. The device 700 may correspond to any of the devices or systems of the assessment network 200 described above, or any other computing devices described herein, and specifically may include, for example, one or several of an assessment system 205, a requestor device 210, a client device 230, a distribution device 235, an assessment device 245, a technician device 250, an access control device 260a, a reviewer device 280, an external assessment device 290, external system 349, data-characterizer device 410, data vector analyzer 420, any of the work flow processors 535, 540, 545, 550, and 555, and/or device 600. Aspects of device 700 may further be incorporated in one or more of data stores 255, 265, 276, 277, 278, 281, 282, 283, 415, 425, and 430 and relational database 172. It will be appreciated that each of the devices referred to that may correspond to an instance of device 700 may be independent and unique from all other instances of device 700 and may include fewer or additional components as those illustrated in FIG. 7.

Various components may be included in device 700. Components may include some or all of the following: a network interface 702 (which may operate in or function as a link layer of a protocol stack), a message processor 704 (which may operate in or function as a network layer of a protocol stack), a communications manager 706 (which may operate in or function as a transport layer of a protocol stack), a communications configurer 708 (which may operate in or function as a portion of transport and/or network layer in a protocol stack), a communications rules provider 710 (which may operate in or function as part of a transport and/or network layer in a protocol stack), and applications 712 (which may operate in or function as an application layer of a protocol stack).

Network interface 702 receives and transmits messages via one or more hardware components that provide a link-layer interconnect. The hardware components associated with network interface 702 may include, for example, a radio frequency (RF) antenna or a port (e.g., Ethernet port) and supporting circuitry. In some embodiments, network interface 702 may be configured to support wireless communication, e.g., using Wi-Fi (IEEE 802.11 family standards), Bluetooth, or other wireless communications standards.

The RF antenna, if present, may be configured to convert electric signals into radio and/or magnetic signals (e.g., to radio waves) to transmit to another device and/or to receive radio and/or magnetic signals and convert them to electric signals. RF antenna may be tuned to operate within a particular frequency band. In some instances, device 700 includes multiple antennas, and the antennas may be, for example, physically separated. In some instances, antennas differ with respect to radiation patterns, polarizations, take-off angle gain and/or tuning bands. Network interface 702 may include one or more phase shifters, filters, attenuators, amplifiers, switches and/or other components to demodulate received signals, coordinate signal transmission and/or facilitate high-quality signal transmission and receipt using the RF antenna.

In some instances, network interface 702 includes a virtual network interface, so as to enable the device to utilize an intermediate device for signal transmission or reception. For example, network interface 702 may include or utilize virtual private networking (VPN) software.

Network interface 702 may be configured to transmit and receive signals over one or more connection types. For example, network interface may be configured to transmit and receive Wi-Fi signals, Ethernet signals, cellular signals, Bluetooth signals, etc.

Message processor 704 may coordinate communication with other electronic devices or systems, such as one or more user devices, requestor devices, assessment systems, data stores, assessment devices, distribution device, reviewer device, etc. In one instance, message processor 704 is able to communicate using a plurality of protocols (e.g., any known, future and/or convenient protocol such as, but not limited to, internet protocol (IP), short message service, (SMS), multimedia message service (MMS), etc.). Message processor 704 may further optionally serialize incoming and/or outgoing messages and facilitate queuing of incoming and outgoing message traffic.

Message processor 704 may perform functions of an Internet or network layer in a network protocol stack. For example, in some instances, message processor 704 may format data packets or segments, combine data packet fragments, fragment data packets and/or identify destination applications and/or device addresses. For example, message processor 704 may defragment and analyze an incoming message to determine whether it is to be forwarded to another device and, if so, may address and fragment the message before sending it to the network interface 702 to be transmitted. As another example, message processor 704 may defragment and analyze an incoming message to identify a destination application that is to receive the message and may then direct the message (e.g., via a transport layer) to the application.

Communications manager 706 may implement transport-layer functions. For example, communications manager 706 may identify a transport protocol for an outgoing message (e.g., transmission control protocol (TCP) or user diagram protocol (UDP)) and appropriately encapsulate the message into transport protocol data units. Message processor 704 may initiate establishment of connections between devices, monitor transmissions failures, control data transmission rates, and monitor transmission quality. As another example, communications manager 706 may read a header of an incoming message to identify an application layer protocol used to receive the message's data. The data may be separated from the header and sent to the appropriate application. Message processor 704 may also monitor the quality of incoming messages, detect out of order incoming packets, detect missing packets, reorder out of order packets, request retransmission of missing packets, request retransmission of out of order packets, etc.

In some instances, characteristics of message-receipt or message-transmission quality may be used to identify a quality status of an established communications link. In some instances, communications manager 706 may be configured to detect signals indicating the stability of an established communications link (e.g., a periodic signal from the other device system, which if received without dropouts, indicates a stable link).

In some instances, a communication configurer 708 is provided to track attributes of another system so as to facilitate establishment of a communication session. In one embodiment, communication configurer 708 further ensures that inter-device communications are conducted in accordance with the identified communication attributes and/or rules. Communication configurer 708 may maintain an updated record of the communication attributes of one or more devices or systems. In one embodiment, communications configurer 708 ensures that communications manager 706 may deliver the payload provided by message processor 704 to the destination (e.g., by ensuring that the correct protocol corresponding to the receiving system is used). Optionally, communications configurer 708 may reformat, encapsulate, or otherwise modify the messages directed to the message processor 704 to ensure that the message processor 704 is able to adequately facilitate transmission of the messages to their ultimate destination.

A communications rules provider 710 may implement one or more communication rules that relate to details of signal transmissions or receipt. For example, a rule may specify or constrain a protocol to be used, a transmission time, a type of link or connection to be used, a destination device, and/or a number of destination devices. A rule may be generally applicable or conditionally applicable (e.g., only applying for messages corresponding to a particular app, during a particular time of day, while a device is in a particular geographical region, when a usage of a local device resource exceeds a threshold, etc.). For example, a rule may identify a technique for selecting between a set of potential destination devices based on attributes of the set of potential destination devices as tracked by communication configure 708. To illustrate, a device having a short response latency may be selected as a destination device. As another example, communications rules provider 710 may maintain associations between various devices or systems and resources. Thus, messages corresponding to particular resources may be selectively transmitted to destinations having access to such resources.

A variety of applications 712 may be configured to initiate message transmission, process incoming transmissions, facilitate permissions requests for access to protected data, facilitate automatic access to protected data, facilitate task work flow permission verification, and/or performing other functions. In the instance depicted in FIG. 7, application modules 712 include a data viewer application 714, a data analyzer application 716, and/or a permission control application 718. It will be appreciated that the application modules depicted in FIG. 7 are merely examples and other example application modules are include, but are not limited to, one that is associated with aspects of actions, methods, and processes disclosed herein.

Data stores 722 may store data for use by application modules 712, as necessary, and may include, for example, generated data store 724, account data store 726, sparse indicator data store 728, and reports data store 730. Optionally, relational database 172 may be included in data store 722. It will be appreciated that fewer or more or different data stores than those illustrated in FIG. 7 may be included in data stores 722, such as any one or more of data stores 255, 265, 276, 277, 278, 281, 282, and 283 depicted in FIG. 2.

One or more of data stores 724, 726, 728, and 730 may be a relational data store, such that elements in one data store may be referenced within another data store. For example, account data store 726 may associate an identifier of a particular account with an identifier of a particular user or client. Additional information about the user may then be retrieved by looking up the account identifier in sparse indicator data store 728, for example.

The components illustrated in FIG. 7 may be useful for establishing data communications and exchanging data between various other systems. For example, independent instances of device 700 may represent the requestor device 210 and the assessment system 205 illustrated in FIG. 3. Other examples are possible.

As an example, data analyzer application 716 may perform alignment of data vectors, request reference data, determine sparse indicators, determine scores, etc. Such actions may be performed in response to messages received by device 700 from another instance of device 700. If data that is unavailable locally in device 700 is needed by an application module 712, a request may be transmitted by device 700, first by generating the request, forwarding the request to communications manager 706, which then may process and modify the request as necessary for subsequent handling by message processor 704. In turn, message processor 704 may process and modify the request as necessary, such as by adding header and/or footer information, for subsequent handling by network interface 702. Network interface 702 may then perform further processing and modification of the request, such as by adding additional header and/or footer information, and then facilitate transmission of the request to a remote system, such as an external system that may possess the needed data.

Figure 8:
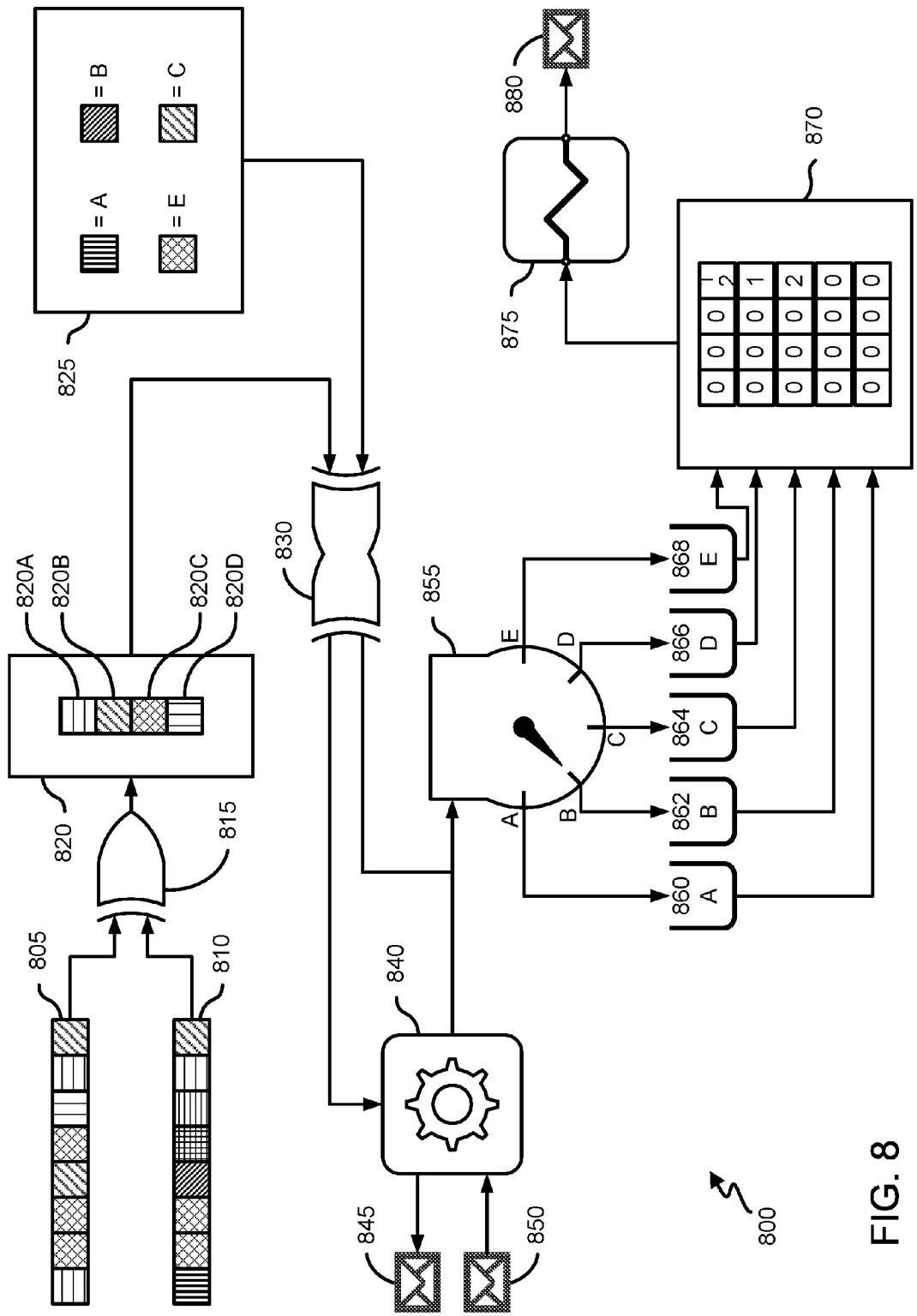
FIG. 8 shows a representation of a system for generating communications, in accordance with some embodiments.

Referring next to FIG. 8, an representation of a system 800 for assigning sparse indicators to data buckets is shown, such as by performing a work flow iteration(s), performing automated processing for stage(s), generating stage result(s) from one or more stages of a work flow, and analyzing data buckets. System 800 may represent portions of assessment system 205 and may, for example, include portions of data generator 240. System 800 may be in data communication with one or more other components of assessment network 200, such as client device 230 and relational database 172, for example.

System 800 includes an assessment device 815, which may be used to analyze and/or compare generated data 805 with reference data 810 to generate a data stream 820, which may include one or more sparse indicators 820A, 820B, 820C, 820D, etc. Thus, it will be appreciated that data 805 may include data aligned with a portion of a reference vector, such that individual values of data 805 may be compared to corresponding values in reference data 810. In some embodiments, multiple individual data vectors are obtained for a particular client and a compiled data vector may be assembled from alignments of a plurality of the individual data vectors. The compiled data vector may be compared with one or more reference data vectors or a compiled reference data vector to identify sparse indicators associated with the compiled data vector for the particular client. Different types of sparse indicators may be identified, such as a one-element sparse indicator representing a single data element different from a reference data vector, or a clustered sparse indicator representing a set of consecutive data elements different from a reference data vector. Although only four sparse indicators 820A-820D are depicted as part of data stream 820, it will be appreciated that more or fewer sparse indicators may be identified for a particular set of generated data and that the four sparse indicators 820A-820D are merely examples.

System 800 further includes a look-up engine 830, which analyzes data stream 820 and may compare with stored data 825 to determine whether an entry in the stored data 825

(e.g., stored data of a particular type) is present for a particular sparse indicator. It will be appreciated that, in some embodiments, data stream 820 need not correspond to a stream. For example, data stream 820 may correspond to a set of data that is not a stream of data, but may instead correspond to a stored data set that is not added to dynamically. Stored data 825 may be stored in one or more data stores, such as relational database 172, for example. It will be appreciated that additional look-up engines 830 may be included in system 800, such as to allow for parallel and/or sequential look up of sparse indicators from data stream 820 in stored data 825.

Stored data 825 may identify sparse indicators based on identifying information associated with the sparse indicators, such as an identifier associated with the sparse indicator, a position associated with the sparse indicator, and/or one or more values associated with the sparse indicator. If a look-up of a particular sparse indicator is successful, look-up engine 830 may direct information associated with the sparse indicator as well as a result(s) from the look-up to bucketor 855. If a look-up of the particular sparse indicator is not successful or if a work flow calls for additional stages, the information associated with the sparse indicator and/or the result(s) from the look-up may be directed to data processor 840.

Look-up engine 830 may further allow for filtering of sparse indicators, such as to determine when an analysis of a particular sparse indicator is not needed. For example, some sparse indicators may be pre-assigned to particular data bucket(s) and look-up engine may identify these sparse indicators as such. In another example, some sparse indicators may not be suitable for an iterative analysis and/or may predetermined such that no resources are to be used in analyzing the sparse indicator. For example, some sparse indicators are associated with a position in a full data set for which analysis is determined to be unnecessary. Optionally, some sparse indicators are associated with a position in a full data set and value for which analysis is determined to be unnecessary.

System 800 further includes a data processor 840, which may perform iterative performance of automated processing for each of the sparse indicators in data stream 820. It will be appreciated that more data processors 840 may be included in system 800, such as to allow parallel and/or sequential work flow performance. Data processor 840 may perform fully automated processing of stages of a work flow and forward stage result(s) to bucketor 855 for data bucket assignment.

In some embodiments of automated processing for one or more sparse indicators, data processor 840 may encounter one or more stages having a stage-progression condition that is not satisfied. Optionally, data processor 840 may generate and transmit a query communication 845 that includes one or more of a position associated with a sparse indicator, one or more values associated with the sparse indicator, and a result(s) from a previous stage of the work flow. The query communication 845 may be transmitted, for example, from system 800 to an evaluation device 270 to facilitate review and/or input by evaluator 275. For example, evaluation device 270 may receive the query communication 845 and display the included information to allow the evaluator 275 to provide response data to satisfy the stage-progression condition. Evaluation device 270 may then generate a response communication 850 that includes response data. Data processor 840 may receive response communication 850 and use the included response data to complete or augment the automated processing to generate stage result(s). Once the stages are completed according to the work flow, stage result(s) may be forward to bucketor 855.

System 800 further includes bucketor 855, which may assign sparse indicators to one of a plurality of data buckets, such as by using stage result(s) from data processor 840 and/or look-up result(s) from look-up engine 830. Bucketor 855 may then assign a particular data bucket for the particular sparse indicator being analyzed. It will be appreciated that more bucketors 855 may be included in system 800. In system 800, five data buckets 860, 862, 864, 866, and 868 are depicted, though it will be appreciated that more or fewer data buckets may be utilized. Data buckets 860-868 may, for example, correspond to categories for a particular sparse indicator, such as Deleterious, Likely Deleterious, Unknown, Likely Non-Deleterious, and Non-Deleterious. Upon full or partial completion of the assignment of the sparse indicators in data stream 820 to data buckets, information may be passed to bucket assessor 870.

System 800 further includes bucket assessor 870. Although bucket assessor 870 is shown schematically as a separate component from bucketor 855, it will be appreciated that bucket assessor 870 and bucketor 855 may be combined in a single component or process. Bucket assessor 870 may identify a number of sparse indicators assigned to particular buckets 860-868 using one or more counters, for example. Bucket assessor 870 may optionally determine whether one or more buckets include counts above a predetermined threshold (e.g., whether a count exceeds zero). The predetermined threshold may be (for example) defined by a user, generated based on machine learning, generated based on a virtual structural representor, and/or generated based on a population analysis. It will be appreciated that predetermined thresholds for each data bucket may be independent of other predetermined thresholds. Bucket assessor 870 may forward the counts corresponding to the buckets 860-868 to signal generator 875.

System 800 further includes signal generator 875. Signal generator 875 may optionally compare the counts for each data bucket against the predetermined threshold(s). Signal generator may use the counts and or results of a comparison, for example, to generate a communication 880 indicative of whether a number of sparse indicators assigned to particular data buckets exceed the predetermined threshold(s). In some embodiments, different templates for communication 880 may be used depending on which data bucket(s) exceed the predetermined threshold(s) and or by how much a threshold(s) is exceeded, for example. Communication 880 may identify, for example, whether one or more sparse indicators are assigned to a Deleterious or Likely Deleterious data bucket. Communication 880 may identify, for example, whether one or more sparse indicators are assigned to a Non-Deleterious or Likely Non-Deleterious data bucket. Communication 880 may identify, for example, whether one or more sparse indicators are assigned to an Unknown data bucket.

Figure 9:
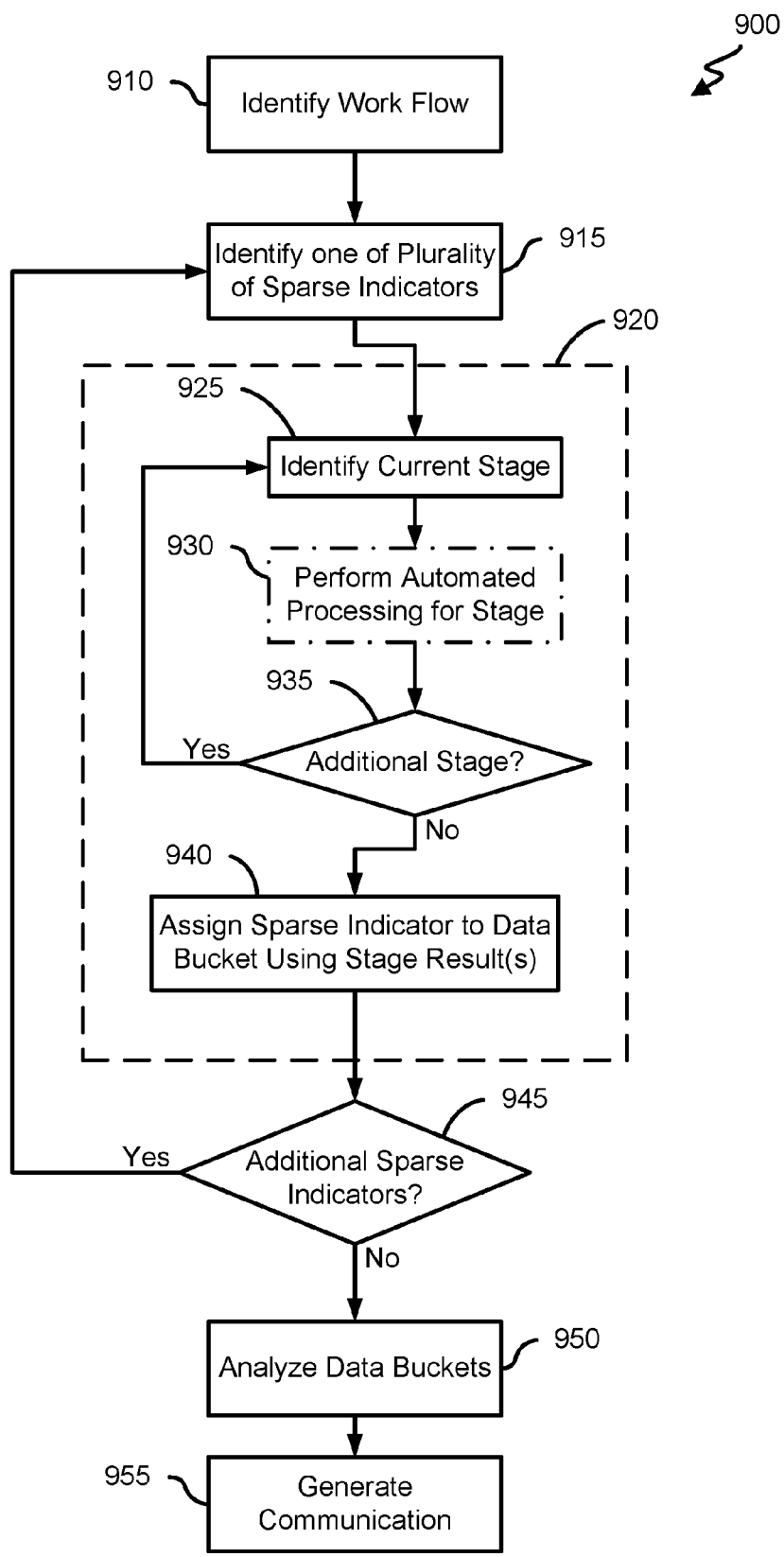
FIG. 9 shows a representation of a process of assigning data elements to data buckets, in accordance with some embodiments.

Turning next to FIG. 9, a representation of an embodiment of a method 900 for generating communications based on numbers of sparse indicators assigned to particular data buckets is shown. At block 910, a work flow is identified. The work flow may correspond to a plurality of stages for which automated processing for a particular sparse indicator is performed. It will be appreciated that an iteration of the work flow may result in one or more stage results, depending on the number of stages performed during the work flow processing for a particular sparse indicator. In some embodiments, a single stage is performed for one sparse indicator (e.g., if a look-up is successful). In another embodiment, multiple stages are performed for another sparse indicator. Stages, as used herein, may correspond to one or more queries that may determine an appropriate data bucket that a particular sparse indicator may be assigned to. In some embodiments, stages are organized in a work flow in a hierarchy such that particular stages follow from other stages. For example, in some embodiments, a first stage result is determinative of whether a second stage is required. In some embodiments, a first stage result is determinative of which particular second stage is to be processed. In some embodiments, a first stage result and/or a second stage result is determinative of which particular third stage is to be processed. It will be appreciated that any number of stages may be performed for a particular iteration of the work flow and that each iteration of the work flow may have an independent number of stages performed in the process of assigning a sparse indicator to a data bucket.

A work flow iteration 920 may be performed, in embodiments, for each of a plurality of sparse indicators that are determined to be included in a data set. At block 915, one sparse indicator is identified for the processing of the work flow iteration 920. At block 925, the current stage is identified, such as from the work flow of block 910. At block 930, automated processing for the stage is performed, such as to generate a stage result(s), for example. At block 935, it is determined whether there are additional stages to process for the work flow iteration for the current sparse indicator. If there is another stage to process for the current sparse indicator, the process flow returns to block 925, where the next stage is identified. It will be appreciated that block 925 may utilize an identifier for the sparse indicator as well as a previous stage result in identifying the stage from work flow of block 910. Blocks 925, 930, and 935 may, for example, correspond to an iterative performance of an automated processing, and may be repeated for each stage of the work flow that is to be performed for the current sparse indicator. If no additional stages are determined at block 935 to be necessary, the sparse indicator is assigned to a data bucket using result(s) from the stage(s).

At block 945, it is determined whether there are additional sparse indicators to process in additional work flow iterations. If there are additional sparse indicators, the process flow returns to block 915 where the next sparse indicator is identified for processing in work flow iteration 920. If there are no additional sparse indicators, the process flow passes to block 950, where the data buckets are analyzed. For example, analyzing the data buckets may include determining whether a number of sparse indicators assigned to a particular data bucket exceed a predefined or predetermined threshold. In some embodiments, the predetermined threshold is zero. In one example embodiment, it is determined whether a data bucket associated with a Deleterious category has more than zero assigned sparse indicators.

At block 955, a communication is generated, such as a communication indicative of whether a number of sparse indicators assigned to a particular data bucket exceeds the threshold. In this way, the sparse indicators may be analyzed and assigned to data buckets and then a communication may be generated that indicates, for example, which data buckets have sparse indicators exceeding a particular threshold. Optionally, independent threshold values are predetermined for each data bucket. In some embodiments, some data buckets may be associated with no or a large threshold value. For example, for data buckets associated with an Unknown, Likely Non-Deleterious, or Non-Deleterious category, it may be desirable to have no particular threshold associated with these data buckets. In another example, for data buckets associated with a Likely Deleterious or Deleterious category, it may be desirable to have a small or zero threshold associated with these data buckets since, for example, these categories may be associated with a higher likelihood of transitioning into an aberrant state.

Figure 10:
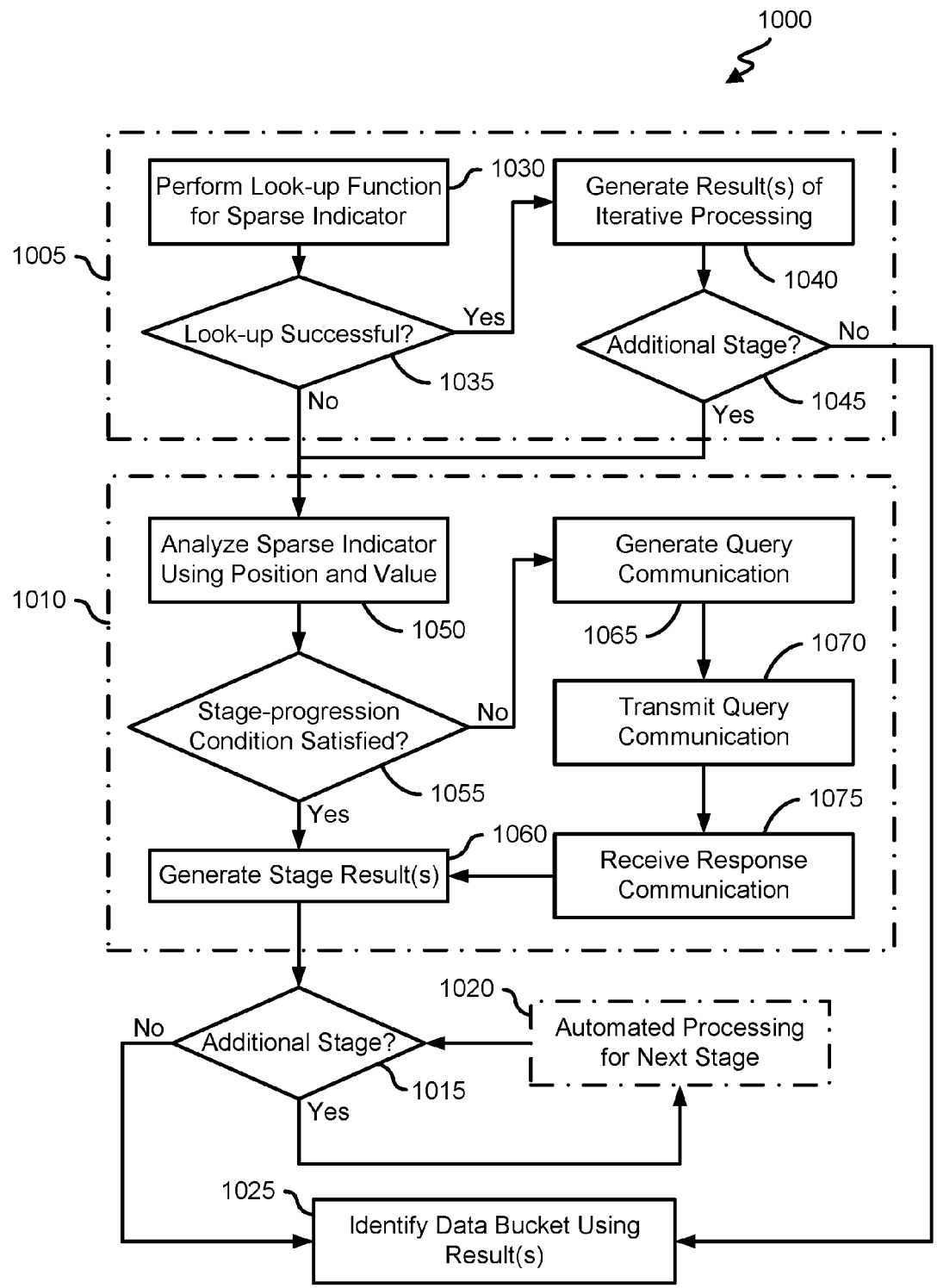
FIG. 10 shows a representation of examples of automated processing for stages of a work flow, in accordance with some embodiments.

Turning next to FIG. 10, a representation of an overview of example embodiment of a work flow iteration 1000 for a sparse indicator is shown. It will be appreciated from the context of FIG. 9 that work flow iteration 1000 may be repeated for each sparse indicator included in a data set. In some embodiments, work flow iteration 1000 corresponds to work flow iteration 920 of FIG. 9.

In FIG. 10, work flow iteration 1000 includes, at block 1005, a first stage automated processing and, at block 1010, a second stage automated processing. At block 1015, it is determined whether additional stages are to performed. If there is an additional stage, process flow continues to block 1020 for the next stage automated processing. After the next stage automated processing is completed, the process flow again returns to block 1015 for further determination of whether there are additional stages for work flow iteration 1000. If there are no additional stages for work flow iteration 1000, process flow continues to block 1025 to identify the data bucket for the sparse indicator.

In block 1005, first stage automated processing includes, at block 1030, performance of a look-up function for the sparse indicator. It will be appreciated that including a look-up function as the first stage of work flow iteration 1000 is useful since, in some embodiments, the look-up may result in identification of a particular data bucket for the sparse indicator and that no additional stages are required. At block 1035, it is determined whether the look-up of the sparse indicator is successful. If the look-up is successful, process flow passes to block 1040, where the result(s) of the iterative processing are generated. For example, a look-up may identify a particular bucket for the sparse indicator. As another example, a look-up may identify a characteristic for the sparse indicator. At block 1045, it is determined whether additional stages for work flow iteration 1000 are to be performed. If no additional stage is to be performed, process flow passes to block 1025 for assignment of the sparse indicator to a data bucket, such as using the results of the iterative processing generated at block 1040.

If the look-up at block 1035 is unsuccessful, process flow passes to second stage automated processing, at block 1010. Further, if an additional stage is determined at block 1045, process flow passes to second stage automated processing, at block 1010. At block 1050, the sparse indicator is analyzed using a position and value associated with the sparse indicator. For example, characteristics of the sparse indicator may be identified. In some embodiments, block 1050 is performed in a fully automated fashion, such as without input from a user or evaluator. For example, fully automated performance of block 1050 may be achieved, in embodiment, using a virtual structural representor, machine learning, an analysis of position and/or value of sparse indicator, etc. In some embodiments, performance of block 1050 may be fully automated if a stage result or a result of automated processing is deterministic. In some embodiments, performance of block 1050 may be fully automated if a confidence value corresponding to a stage or automated processing result is greater than a threshold confidence value. At block 1055, it is determined whether a stage-progression condition is satisfied. If the stage-progression condition is satisfied, process flow passes to block 1060, where the stage result(s) is generated, which may correspond to, for example, the characteristics of the sparse indicator. If the stage-progression condition is not satisfied, process flow passes to block 1065, where a query communication is generated, which may include, for example, one or more of an identifier associated with the sparse indicator, the position of the sparse indicator, one or more values associated with the sparse indicator, the results of a previous stage(s), and a proposed or preliminary stage result.

At block 1070, the query communication is transmitted. For example, in some embodiments, the query communication may be transmitted to an evaluation device to facilitate determination of a response communication. For example, evaluation device may allow for an evaluator to provide input to be included as part of response communication. For example, an evaluator may provide input corresponding to determination of characteristics of a sparse indicator and these characteristics may be included in a response communication. Alternatively or additionally, an evaluator may provide input corresponding to a determination of a response to a query relating to the sparse indicator and this response may be included in the response communication. Alternatively or additionally, an evaluator may provide input corresponding to a confirmation of automatically determined characteristics of a sparse indicator and/or a preliminary or proposed stage result and this confirmation may be included in the response communication. Alternatively or additionally, an evaluator may provide input corresponding to an override of automatically determined characteristics of a sparse indicator and/or a preliminary or proposed stage result this override may be included in the response communication. At block 1075, the response communication may be received, after which the response communication may be used to generate the stage result(s).

As described above, additional stages may be included in work flow iteration 1000, and blocks 1015 and 1020 correspond to the determination of whether additional stages are to be performed and the performance of the next stage automated processing. It will be appreciated that the automated processing at block 1030 may be the same as or different than the first stage automated processing of block 1005 or the second stage automated processing of block 1010. In some embodiments, automated processing stages may be used to independently determine characteristics of a sparse indicator, such as a zygosity of the sparse indicator, a deletion status(es) or characteristic(s) of the sparse indicator, a frequency of the sparse indicator in a population(s), and other characteristics, such as a functional consequence(s) of the sparse indicator, for example a sub-unit change to a unit associated with the sparse indicator (e.g., as compared to a reference unit), or a structural change to a unit associated with the sparse indicator (e.g., as compared to a reference unit). Finally, once all stages are complete, process flow passes to block 1025 to identify the assignment of the sparse indicator to a data bucket.

As described above, work flow iteration 1000 may be performed independently for each sparse indicator in a data set or a data stream. As such, the number and type of stages may be different for each sparse indicator, depending on the work flow and sparse indicator identity, position, and value(s). In some embodiments, each stage of work flow iteration 1000 for a particular sparse indicator may be completed without user or evaluator input, allowing for fully automated characterization and assignment of a sparse indicator to a data bucket. In some embodiments, all stage-progression conditions may be satisfied without user or evaluator input, allowing for fully automated characterization and assignment of a sparse indicator to a data bucket.

Figure 11:
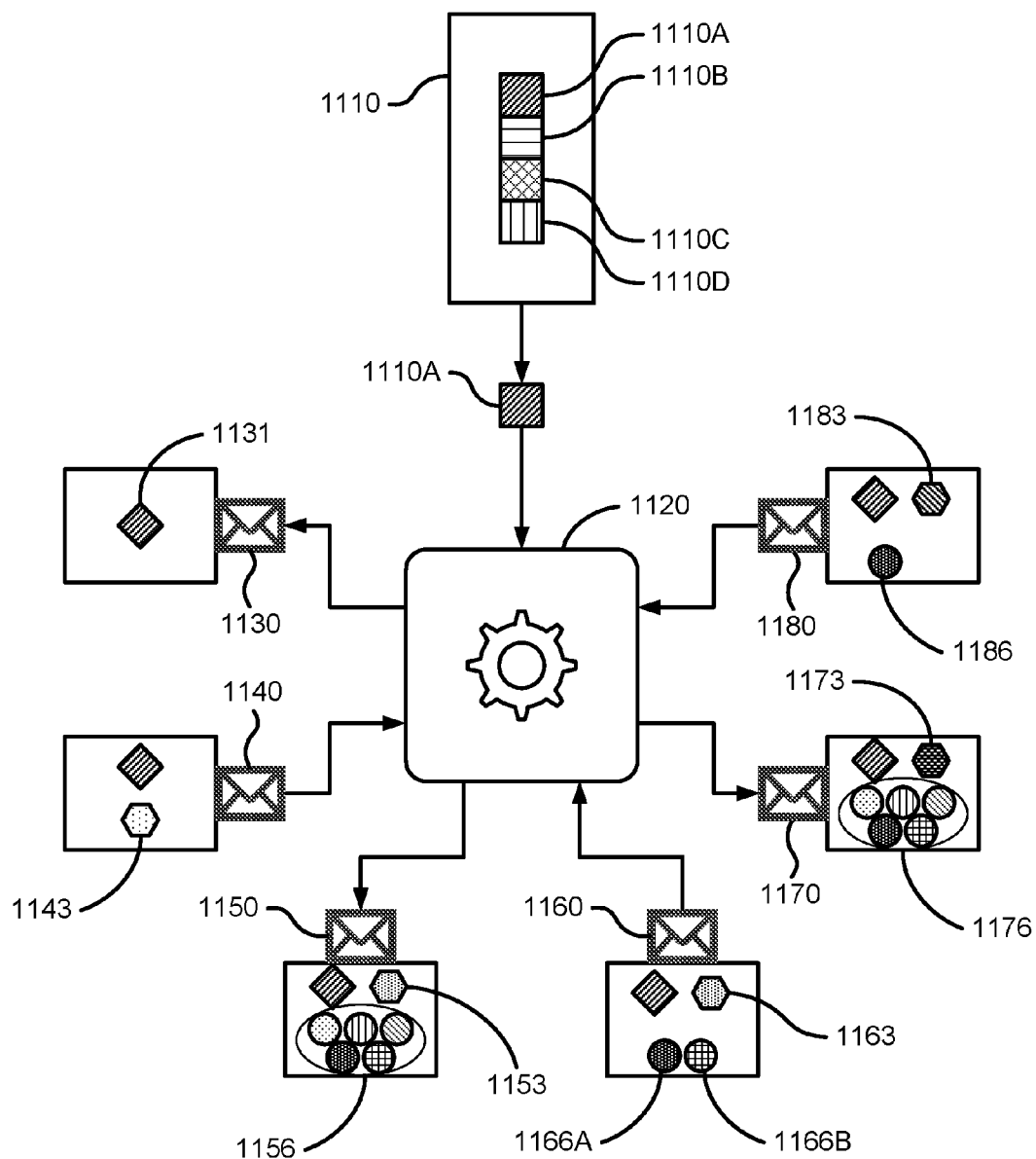
FIG. 11 shows a representation a portion of a system for assigning sparse indicators to data buckets and depicts a variety of transmitted and received communications.

FIG. 11 shows a representation of a portion of a system for assigning sparse indicators to data buckets and depicts a variety of transmitted and received communications. In FIG. 11, a variety of components of the system for assigning spares indicators data buckets are intentionally not depicted so as to not obscure relevant details being described. A data stream 1110 is shown in FIG. 11 that includes sparse indicators 1110A, 1110B, 1110C, and 1110D. A data stream may correspond to a collection of data elements that may be received simultaneously or sequentially. Sparse indicator 1110A is shown as being forwarded to data processor 1120 for processing of a work flow iteration. For the embodiment illustrated, it may be determined that several stage-progression conditions of an automated processing are not satisfied, and so data processor 1120 transmits query communications and receives several response communications. For example, data processor 1120 transmits a first query communication 1130 when a first stage-progression condition of an automated processing for a first stage is not satisfied. As examples, first query communication may be transmitted to a user device or evaluation device, in some embodiments. Here, first query communication 1130 includes information related to the sparse indicator 1110A, represented as element 1131. Element 1131 may include one or more of an identifier associated with the sparse indicator 1110A, a position associated with the sparse indicator 1110A, and one or more values associated with the sparse indicator 1110A. The information related to the sparse indicator may facilitate generation of a response to the first query communication 1130, such as by providing the information to a user or evaluator for analysis of the sparse indicator 1110A, such as to determine a category, classification, data bucket and/or characteristic for the sparse indicator 1110A.

A first response communication 1140 may be received by data processor 1120, and may be transmitted, for example, by the user device or evaluation device that received first query communication 1130. As illustrated, first response communication 1130 includes information associated with sparse indicator 1110A, but also includes first response data 1143. Response data may correspond, for example, to a category, classification, data bucket and/or characteristic for the sparse indicator 1110A.

Data processor 1120 may transmit a second query communication 1150 when a second stage-progression condition of an automated processing for a second stage is not satisfied. Here, second query communication 1150 includes information related to the sparse indicator 1110A, represented as element 1131. Element 1131 may include one or more of an identifier associated with the sparse indicator 1110A, a position associated with the sparse indicator 1110, and one or more values associated with the sparse indicator 1110A. The information related to the sparse indicator may facilitate generation of a response to the first query communication 1130, such as by providing the information to a user or evaluator for analysis of the sparse indicator 1110A, but also proposed second response data 1153, as well as a set of support-data objects 1156.

A second response communication 1160 may be received by data processor 1120. As illustrated, second response communication 1160 includes information associated with sparse indicator 1110A, and also includes second response data 1163, which is illustrated as the same as proposed second response data 1153, indicating that the proposed response data 1153 is confirmed by second response communication 1160. Second response data also includes an identification of support-data objects 1166A and 1166B as selected from the set of support-data objects 1156 for supporting the second response data 1163, which illustrate that a plurality of support-data objects may be identified in a response communication as supporting a particular response data.

Data processor 1120 may transmit a third query communication 1170 when a third stage-progression condition of an automated processing for a third stage is not satisfied. Here, third query communication 1170 again includes information related to the sparse indicator 1110A, a proposed third response data 1173, and a set of support-data objects 1176. Although the set of support-data objects 1176 is depicted as being the same as the set of support-data objects 1156, in some embodiments, a set of support-data objects identified in different query communications related to the same sparse indicator may be different.

A third response communication 1180 may be received by data processor 1120. As illustrated, third response communication 1180 includes information associated with sparse indicator 1110A, and also includes third response data 1183, which is illustrated as the different proposed third response data 1173, indicating that the proposed response data 1173 is to be overridden with third response data 1183 by third response communication 1180. Third response data also includes an identification of a support-data object 1186 as selected from the set of support-data objects 1176 for supporting the third response data 1183. It will be appreciated that support-data object 1186 may be the same as support-data object 1166A previously identified in second response communication, and that a particular support-data object may be useful for supporting multiple response data, though different response-data objects may be used for supporting each response data, in some embodiments.

As will be appreciated with reference to FIG. 8 and the associated description, data processor 1120 may use the response data 1143, 1156, and 1183 in assignment of sparse indicator 1110A to a data bucket. It will be further appreciated that, although FIG. 11 depicts query and response communications for three automated processings associated with three stages of a work flow, more or fewer query and response communications may be used for each or all stages and more or fewer query and response communications may be utilized for a particular work flow iteration.

Figure 12A:
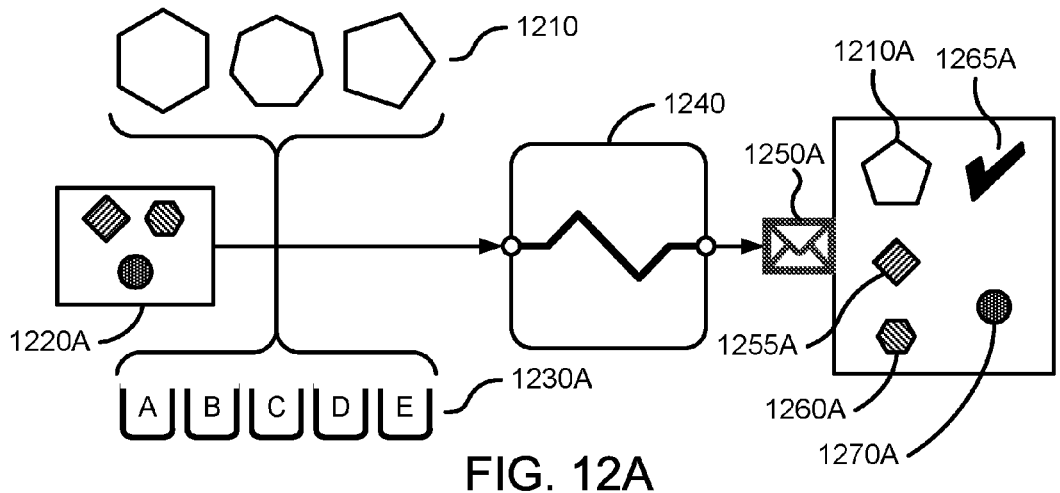
FIG. 12A, FIG. 12B, and FIG. 12C show representations of a portion of a system for generating report communications based on communication templates and sparse indicator buckets.
Figure 12B:
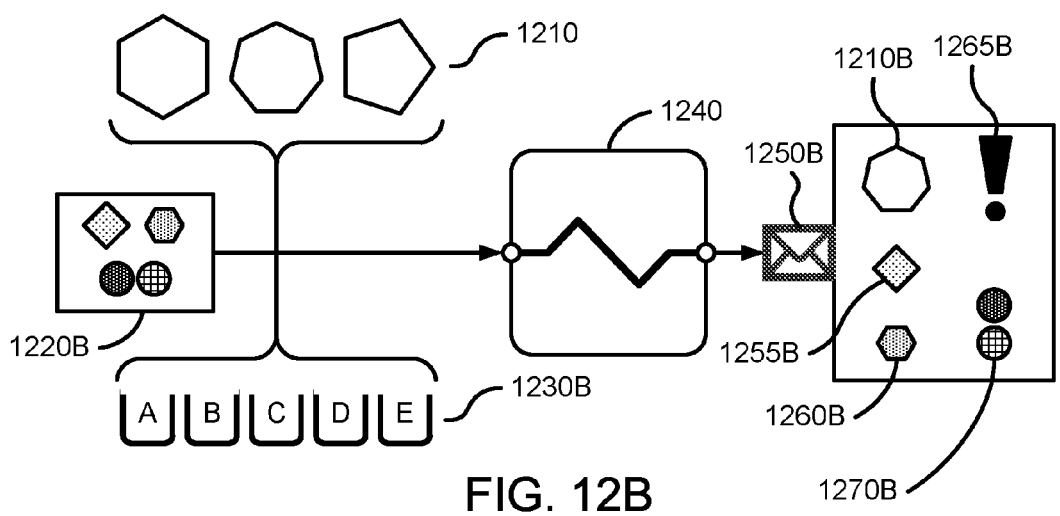
Figure 12C:
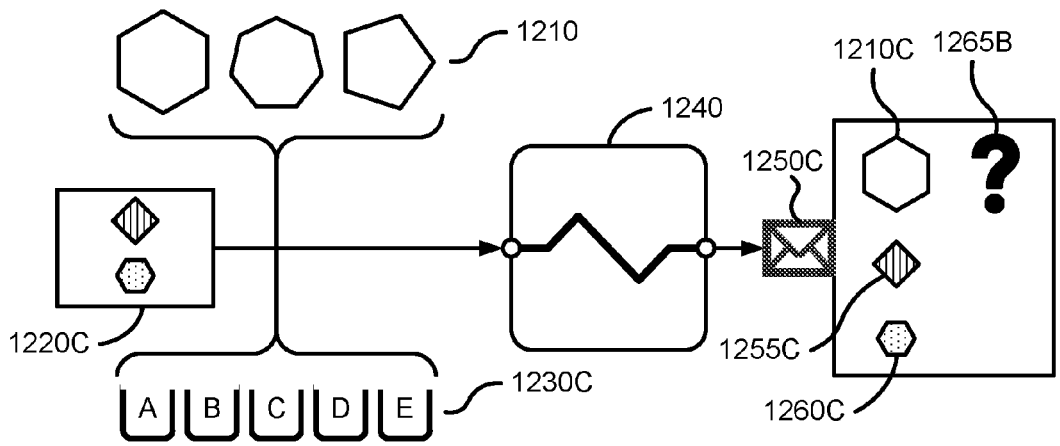

FIGS. 12A, 12B, and 12C shows representations of a portion of a system for generating report communications based on communication templates. In FIG. 12, a variety of templates are identified in template set 1210. Template set 1210 includes template 1210A, template 1210B, and template 1210C. It will be appreciated that more or fewer templates may be utilized by the systems, methods, and products described herein, but for illustration purposes, FIGS. 12A-12C depict three templates in template set 1210. Template set 1210 is accessible by signal generator 1240 for use in generating communications 1250A, 1250B, or 1250C. Sparse indicator information 1220A, 1220B, or 1220C are also accessible to signal generator 1240 for use in generating communications 1250A, 1250B, or 1250C. Data bucket information 1230A, 1230B, or 1230C is also accessible to signal generator 1240 for use in generating communications 1250A, 1250B, or 1250C. It will be appreciated that, although data bucket information 1230A, 1230B, or 1230C is illustrated in FIGS. 12A-12C, count information related to the data buckets may used additionally or alternatively by signal generator 1240 for use in generating communications, such as is illustrated with respect to FIG. 8. It will be appreciated that each template in template set 1210 may identify the same or different information to be included in a communication generated by signal generator 1240, and that each template in template set 1210 may be independent of other templates in template set 1210.

In FIG. 12A, template set 1210, sparse indicator information 1220A, and data bucket information 1230A are used by signal generator 1240 to generate communication 1250A. For example, sparse indicator information 1220A may relate to one or more stage results from an automated processing regarding a sparse indicator. Communication 1250A may correspond to a report communication. Signal generator 1240 may identify template 1210A from template set 1210 as relevant for use in generation of communication 1250A, such as by identification of a sparse indicator identifier 1255A or a sparse indicator characteristic 1260A related to sparse indicator information 1220A, or by analyzing data bucket information 1230A. For example, data bucket count information may be used by signal generator 1240 to identify a particular template from template set 1210, such as if a count level of one or more buckets exceeds one or more corresponding thresholds, a particular template is to be used for the corresponding communication generated by signal generator 1240.

As illustrated in FIG. 12A, communication 1250A makes use of template 1210A and includes sparse indicator identifier 1255A, sparse indicator characteristic 1260A, and information 1265A. Optionally, communication 1250A includes support-data object identifier 1270A. Information 1265A may correspond to text and/or graphics describing, for example, a predicted impact of a sparse indicator, such as a likelihood of a client transitioning into a particular state. Information 1265A may optionally include statistical information related to the predicted impact of the sparse indicator. Information 1265A may be dependent upon bucket information, for example. Information 1265A illustrated in FIG. 12A may correspond, for example, to information included in communication 1250A when template 1210A is identified by signal generator 1240 based on a particular data bucket threshold, such as Non-deleterious, as being exceeded.

In FIG. 12B, template set 1210, sparse indicator information 1220B, and data bucket information 1230B are used by signal generator 1240 to generate communication 1250B. For example, sparse indicator information 1220B may relate to one or more stage results from an automated processing regarding a sparse indicator. Communication 1250B may correspond to a report communication. Signal generator 1240 may identify template 1210B from template set 1210 as relevant for use in generation of communication 1250B, such as by identification of a sparse indicator identifier 1255B or a sparse indicator characteristic 1260B related to sparse indicator information 1220B, or by analyzing data bucket information 1230B.

As illustrated in FIG. 12B, communication 1250AB makes use of template 1210B and includes sparse indicator identifier 1255B, sparse indicator characteristic 1260B, and information 1265B. Optionally, communication 1250B includes support-data object identifier 1270B. Information 1265B may correspond to text and/or graphics describing, for example, a predicted impact of a sparse indicator, such as a likelihood of a client transitioning into a particular state. Information 1265B may optionally include statistical information related to the predicted impact of the sparse indicator. Information 1265B may be dependent upon bucket information, for example. Information 1265B illustrated in FIG. 12B may correspond, for example, to information included in communication 1250B when template 1210B is identified by signal generator 1240 based on a particular data bucket threshold, such as Deleterious, as being exceeded.

Information may, for example identify bucket/category for each of one, more, or all sparse identifiers assigned to one or more particular buckets. For example, each sparse indicator assigned to a Deleterious bucket may be identified along with information representing the assignment.

In FIG. 12B, template set 1210, sparse indicator information 1220B, and data bucket information 1230B are used by signal generator 1240 to generate communication 1250B. For example, sparse indicator information 1220B may relate to one or more stage results from an automated processing regarding a sparse indicator. Communication 1250B may correspond to a report communication. Signal generator 1240 may identify template 1210B from template set 1210 as relevant for use in generation of communication 1250B, such as by identification of a sparse indicator identifier 1255B or a sparse indicator characteristic 1260B related to sparse indicator information 1220B, or by analyzing data bucket information 1230B.

As illustrated in FIG. 12B, communication 1250B makes use of template 1210B and includes sparse indicator identifier 1255B, sparse indicator characteristic 1260B, and information 1265B. Optionally, communication 1250B includes a plurality of support-data object identifiers 1270B. Information 1265B may correspond to text and/or graphics describing, for example, a predicted impact of a sparse indicator, such as a likelihood of a client transitioning into a particular state. Information 1265B may optionally include statistical information related to the predicted impact of the sparse indicator. Information 1265B may be dependent upon bucket information, for example. Information 1265B illustrated in FIG. 12B may correspond, for example, to information included in communication 1250B when template 1210B is identified by signal generator 1240 based on a particular data bucket threshold, such as Deleterious, as being exceeded.

In FIG. 12C, template set 1210, sparse indicator information 1220C, and data bucket information 1230C are used by signal generator 1240 to generate communication 1250C. For example, sparse indicator information 1220C may relate to one or more stage results from an automated processing regarding a sparse indicator. Communication 1250C may correspond to a report communication. Signal generator 1240 may identify template 1210C from template set 1210 as relevant for use in generation of communication 1250C, such as by identification of a sparse indicator identifier 1255C or a sparse indicator characteristic 1260C related to sparse indicator information 1220C, or by analyzing data bucket information 1230C.

As illustrated in FIG. 12C, communication 1250C makes use of template 1210C and includes sparse indicator identifier 1255C, sparse indicator characteristic 1260C, and information 1265C. Information 1265C may correspond to text and/or graphics describing, for example, a predicted impact of a sparse indicator, such as a likelihood of a client transitioning into a particular state. Information 1265C illustrated in FIG. 12C may correspond, for example, to information included in communication 1250C when template 1210C is identified by signal generator 1240 based on a particular data bucket threshold, such as Unknown, as being exceeded.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine- or processor-executable instructions, which may be used to cause a machine or one or more processors to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

We claim:

1. A system for generating communications based on numbers of variants assigned to particular categories, comprising:
   one or more hardware processors; and
   a non-transitory computer readable storage medium in data communication with the one or more hardware processors, the non-transitory computer readable storage medium comprising instructions that, when executed by the one or more hardware processors, cause the one or more hardware processors to perform operations including:
   determining, at the one or more hardware processors, that a first sequence includes one or more variants, wherein each variant of the one or more variants corresponds to an instance of one or more bases in the first sequence differing from a corresponding one or more bases in a reference sequence, and wherein each variant of the one or more variants is associated with a position and one or more bases;
   accessing a work flow for assigning variants to categories, wherein the work flow includes a plurality of stages organized according to a hierarchical structure, and wherein a trajectory through the work flow is determined based on successive results generated for one or more of the plurality of stages;

for each variant of the one or more variants, performing a work flow iteration by:
    iteratively performing, at the one or more hardware processors, an automated processing in accordance with each of one or more stages of the plurality of stages according to the work flow based on at least one of:
        a position associated with the variant;
        the one or more bases associated with the variant; and
        a result of a previous stage;
        wherein a result of the stage is generated at least partly in response to the automated processing, and wherein a next stage is determined based on the result of the stage;
    wherein performing an automated processing in accordance with a stage of the one or more stages includes:
        performing, at the one or more hardware processors, a look-up function using an identifier of the variant to determine whether stored data indicates that the variant is to be assigned to a specific category of a plurality of categories; and
        generating the result of the iterative performance of the automated processing that identifies the specific category when the stored data indicates that the variant is to be assigned to the specific category; and
    assigning the variant to a category of the plurality of categories based on results of the iterative performance of the automated processing;
    determining whether a number of variants assigned to a particular category of the plurality of categories exceeds a predefined threshold; and
    generating a communication indicative of whether a number of variants assigned to the particular category exceeds the predefined threshold.

2. The system for generating communications based on numbers of variants assigned to particular categories as recited in claim 1, wherein the iterative performance of the automated processing includes:
    determining, for a stage of the plurality of stages, that a stage-progression condition is not satisfied based on the automated processing;
    generating a query communication that identifies:
        the position associated with the variant;
        the one or more bases associated with the variant; and
        a result of a previous stage of the work flow;
    transmitting the query communication to a device;
    receiving a response communication from the device that includes response data; and
    determining the result of the stage using the response data.

3. The system for generating communications based on numbers of variants assigned to particular categories as recited in claim 2, wherein the query communication identifies a preliminary stage result, and wherein the response data includes a confirmation of the preliminary stage result.

4. The system for generating communications based on numbers of variants assigned to particular categories as recited in claim 2, wherein:
    the response communication further identifies a support-data object; and
    the iterative performance of the automated processing includes:
        storing an identifier of the stage in association with each of:
            the result; and
            an identifier of the support-data object;
        generating a second communication that identifies:
            the position associated with the variant;
            the one or more bases associated with the variant;
            the result; and
            the identifier or a second identifier of the support-data object;
        transmitting the second communication to a second device; and
        receiving a second response communication from the second device that includes second response data indicating whether the result is confirmed; and
        wherein the result of the stage is further determined based on the second response communication.

5. The system for generating communications based on numbers of variants assigned to particular categories as recited in claim 2, wherein the query communication identifies a preliminary stage result, and wherein the response data includes an override of the preliminary stage result.

6. The system for generating communications based on numbers of variants assigned to particular categories as recited in claim 1, wherein the iterative performance of the automated processing includes, for a particular variant of the one or more variants:
    identifying a type of processing to be performed during a stage of the one or more stages, the type of processing including determining a result corresponding to a predicted effect of the particular variant on a unit structure;
    inputting data to a virtual structural representor that is configured to perform a virtual assessment corresponding to the type of processing;
    receiving, from the virtual structural representor, a preliminary result;
    generating a query communication that identifies:
        the position associated with the particular variant;
        the one or more bases associated with the particular variant; and
        the preliminary result;
    transmitting the query communication to a device;
    receiving a response communication from the device that includes response data, wherein the response data indicates that the preliminary result is confirmed; and
    defining a result of the stage to include the preliminary result.

7. The system for generating communications based on numbers of variants assigned to particular categories as recited in claim 1, wherein the identifier of the variant is representative of, at least, the position associated with the variant.

8. The system for generating communications based on numbers of variants assigned to particular categories as recited in claim 1, wherein the identifier of the variant is representative of, at least, the position associated with the variant and the one or more bases associated with the variant.

9. The system for generating communications based on numbers of variants assigned to particular categories as recited in claim 1, wherein the iterative performance of the automated processing, for a particular variant of the one or more variants, includes:
    determining that all stage-progression conditions for the iterative performance are satisfied for the particular variant based on the automated processing; and
    generating the results of the iterative performance for the particular variant.

10. The system for generating communications based on numbers of variants assigned to particular categories as recited in claim 1, wherein the iterative performance of the automated processing includes:
  determining, for a stage of the plurality of stages, that a stage-progression condition is not satisfied;
  generating a query communication that identifies:
    the position associated with the variant;
    the one or more bases associated with the variant; and
    a set of potential support-data objects;
  transmitting the query communication to a device;
  receiving a response communication from the device that includes response data that identifies one or more support data of the set of potential support-data object; and
  generating the results of the iterative performance, wherein the results of the iterative performance include the one or more support-data objects.

11. The system for generating communications based on numbers of variants assigned to particular categories as recited in claim 1, wherein the iterative performance of the automated processing includes:
  identifying one or more support-data objects of a set of potential support-data objects; and
  generating the results of the iterative performance, wherein the results of the iterative performance include an identifier for the one or more support-data objects.

12. The system for generating communications based on numbers of variants assigned to particular categories as recited in claim 1, wherein generating the communication includes:
  selecting a communication template from amongst a plurality of communication templates, wherein the selection is based on the determining whether the number of variants assigned to the particular category of the plurality of categories exceeds the predefined threshold; and
  populating the communication template with information associated with the results of the iterative performance of the automated processing for each variant of the one or more variants.

13. The system for generating communications based on numbers of variants assigned to particular categories as recited in claim 1, wherein the plurality of categories includes one or more of a pathogenic category, a likely pathogenic category, an unknown category, a likely benign category, and a benign category.

14. A computer-implemented method for generating communications based on numbers of variants assigned to particular categories, the method comprising:
  determining, at one or more processors, that a first sequence includes one or more variants, wherein each variant of the one or more variants corresponds to an instance of one or more bases in the first sequence differing from a corresponding one or more bases in a reference sequence, and wherein each variant of the one or more variants is associated with a position and one or more bases;
  accessing a work flow for assigning variants to categories, wherein the work flow includes a plurality of stages organized according to a hierarchical structure, and wherein a trajectory through the work flow is determined based on successive results generated for one or more of the plurality of stages;
  for each variant of the one or more variants, performing a work flow iteration by:
    iteratively performing, at the one or more processors, an automated processing in accordance with each of one or more stages of the plurality of stages according to the work flow based on at least one of:
      a position associated with the variant;
      the one or more bases associated with the variant; and
      a result of a previous stage;
      wherein a result of the stage is generated at least partly in response to the automated processing, and wherein a next stage is determined based on the result of the stage;
      wherein performing an automated processing in accordance with a stage of the one or more stages includes:
        performing a look-up function using an identifier of the variant to determine whether stored data indicates that the variant is to be assigned to a specific category of a plurality of categories; and
        generating the result of the iterative performance of the automated processing that identifies the specific category when the stored data indicates that the variant is to be assigned to the specific category; and
    assigning the variant to a category of the plurality of categories based on results of the iterative performance of the automated processing;
  determining whether a number of variants assigned to a particular category of the plurality of categories exceeds a predefined threshold; and
  generating a communication indicative of whether a number of variants assigned to the particular category exceeds the predefined threshold.

15. The computer-implemented method for generating communications based on numbers of variants assigned to particular categories as recited in claim 14, wherein the iterative performance of the automated processing includes:
  determining, for a stage of the plurality of stages, that a stage-progression condition is not satisfied based on the automated processing;
  generating a query communication that identifies:
    the position associated with the variant;
    the one or more bases associated with the variant; and
    a result of a previous stage of the work flow;
  transmitting the query communication to a device;
  receiving a response communication from the device that includes response data; and
  determining the result of the stage using the response data.

16. The computer-implemented method for generating communications based on numbers of variants assigned to particular categories as recited in claim 15, wherein the query communication identifies a preliminary stage result, and wherein the response data includes an override of the preliminary stage result.

17. The computer-implemented method for generating communications based on numbers of variants assigned to particular categories as recited in claim 15, wherein the query communication identifies a preliminary stage result, and wherein the response data includes a confirmation of the preliminary stage result.

18. The computer-implemented method for generating communications based on numbers of variants assigned to particular categories as recited in claim 15, wherein:
  the response communication further identifies a support-data object; and the iterative performance of the automated processing includes:
    storing an identifier of the stage in association with each of:
        the result; and
        an identifier of the support-data object;
    generating a second communication that identifies:
        the position associated with the variant;
        the one or more bases associated with the variant;
        the result; and
        the identifier or a second identifier of the support-data object;
    transmitting the second communication to a second device; and
    receiving a second response communication from the second device that includes second response data indicating whether the result is confirmed; and
    wherein the result of the stage is further determined based on the second response communication.

19. The computer-implemented method for generating communications based on numbers of variants assigned to particular categories as recited in claim 14, wherein the iterative performance of the automated processing includes, for a particular variant of the one or more variants:
    identifying a type of processing to be performed during a stage of the one or more stages, the type of processing including determining a result corresponding to a predicted effect of the particular variant on a unit structure;
    inputting data to a virtual structural representor that is configured to perform a virtual assessment corresponding to the type of processing;
    receiving, from the virtual structural representor, a preliminary result;
    generating a query communication that identifies:
        the position associated with the particular variant;
        the one or more bases associated with the particular variant; and
        the preliminary result;
    transmitting the query communication to a device;
    receiving a response communication from the device that includes response data, wherein the response data indicates that the preliminary result is confirmed; and
    defining a result of the stage to include the preliminary result.

20. A non-transitory computer readable storage medium for generating communications based on numbers of variants assigned to particular categories, the non-transitory computer readable storage medium comprising instructions that, when executed by one or more processors, cause the one or more processors to perform operations including:
    determining, at the one or more processors, that a first sequence includes one or more variants, wherein each variant of the one or more variants corresponds to an instance of one or more bases in the first sequence differing from a corresponding one or more bases in a reference sequence, and wherein each variant of the one or more variants is associated with a position and one or more bases;
    accessing a work flow for assigning variants to categories, wherein the work flow includes a plurality of stages organized according to a hierarchical structure, and wherein a trajectory through the work flow is determined based on successive results generated for one or more of the plurality of stages;
    for each variant of the one or more variants, performing a work flow iteration by:
        iteratively performing, at the one or more processors, an automated processing in accordance with each of one or more stages of the plurality of stages according to the work flow based on at least one of:
            a position associated with the variant;
            the one or more bases associated with the variant; and
            a result of a previous stage;
            wherein a result of the stage is generated at least partly in response to the automated processing, and wherein a next stage is determined based on the result of the stage;
            wherein performing an automated process in accordance with a stage of the one or more stages includes:
                performing, at the one or more processors, a look-up function using an identifier of the variant to determine whether stored data indicates that the variant is to be assigned to a specific category of a plurality of categories; and
                generating the result of the iterative performance of the automated processing that identifies the specific category when the stored data indicates that the variant is to be assigned to the specific category; and
        assigning the variant to a category of the plurality of categories based on results of the iterative performance of the automated processing;
    determining whether a number of variants assigned to a particular category of the plurality of categories exceeds a predefined threshold; and
    generating a communication indicative of whether a number of variants assigned to the particular category exceeds the predefined threshold.

* * * * *